(12) United States Patent
Shin et al.

(10) Patent No.: US 12,468,477 B2
(45) Date of Patent: Nov. 11, 2025

(54) SEMICONDUCTOR DEVICE FOR GENERATING AN INTERNAL VOLTAGE

(71) Applicant: SK hynix Inc., Icheon-si (KR)

(72) Inventors: Yoon Jae Shin, Icheon-si (KR); Min Jeong Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 173 days.

(21) Appl. No.: 18/351,855

(22) Filed: Jul. 13, 2023

(65) Prior Publication Data

US 2024/0345765 A1 Oct. 17, 2024

(30) Foreign Application Priority Data

Apr. 14, 2023 (KR) .......................... 10-2023-0049682

(51) Int. Cl.
*G11C 11/4074* (2006.01)
*G06F 3/06* (2006.01)

(52) U.S. Cl.
CPC .......... *G06F 3/0655* (2013.01); *G06F 3/0604* (2013.01); *G06F 3/0679* (2013.01); *G11C 11/4074* (2013.01)

(58) Field of Classification Search
CPC .... G06F 3/0655; G06F 3/0604; G06F 3/0679; G11C 11/4074; G11C 5/148; G11C 5/147
USPC ........................................... 365/226, 230.06
See application file for complete search history.

(56) References Cited

U.S. PATENT DOCUMENTS

| | | | | |
|---|---|---|---|---|
| 4,994,688 A * | 2/1991 | Horiguchi | ............... | G05F 1/465 |
| | | | | 323/907 |
| 5,508,962 A * | 4/1996 | McLaughlin | ....... | G11C 11/4074 |
| | | | | 327/530 |
| 10,845,833 B1 | 11/2020 | Dietrich et al. | | |
| 2002/0011883 A1* | 1/2002 | Yamazaki | ............... | G11C 5/143 |
| | | | | 327/143 |
| 2007/0047365 A1* | 3/2007 | Yoshinaga | ............. | G11C 5/147 |
| | | | | 365/226 |
| 2007/0223297 A1* | 9/2007 | Hirota | ....................... | G11C 7/02 |
| | | | | 365/208 |
| 2014/0059398 A1* | 2/2014 | Cunningham | ....... | G11C 29/026 |
| | | | | 714/721 |
| 2016/0109932 A1* | 4/2016 | Jeon | ....................... | G06F 1/3296 |
| | | | | 713/323 |
| 2019/0259455 A1* | 8/2019 | Kashihara | ............... | G11C 16/12 |
| 2019/0377401 A1* | 12/2019 | Maeda | ..................... | G11C 11/40 |
| 2020/0284883 A1* | 9/2020 | Ferreira | ................ | G01S 7/4815 |
| 2021/0098064 A1* | 4/2021 | Lee | ..................... | G11C 13/0028 |
| 2021/0167041 A1* | 6/2021 | Yoshihara | ............... | H01L 24/49 |

(Continued)

FOREIGN PATENT DOCUMENTS

KR 1020120050247 A 5/2012

*Primary Examiner* — Michael T Tran
(74) *Attorney, Agent, or Firm* — WILLIAM PARK AND ASSOCIATES LTD.

(57) ABSTRACT

A semiconductor device includes an internal voltage control circuit including an amplifier circuit and a plurality of drivers. The internal voltage control circuit is configured to drive an internal voltage through the sharing of the amplifier circuit and a driver that is activated, among the plurality of drivers, after the start of a standby operation and an active operation. The semiconductor device also includes a core circuit including a plurality of banks. The core circuit is configured to perform an operation of a bank that is activated, among the plurality of banks, by receiving the internal voltage.

24 Claims, 16 Drawing Sheets

(56) References Cited

U.S. PATENT DOCUMENTS

| | | | |
|---|---|---|---|
| 2021/0327239 A1* | 10/2021 | Falkenburg | G01N 21/17 |
| 2022/0068346 A1* | 3/2022 | Chen | G11C 7/1012 |
| 2022/0284980 A1* | 9/2022 | Chiang | G11C 29/44 |
| 2022/0413534 A1* | 12/2022 | Liang | G05F 1/575 |
| 2024/0412774 A1* | 12/2024 | Chen | G11C 11/4076 |
| 2024/0427502 A1* | 12/2024 | Zainuddin | G11C 16/08 |

* cited by examiner

SEMICONDUCTOR DEVICE FOR GENERATING AN INTERNAL VOLTAGE

CROSS-REFERENCE TO RELATED APPLICATION

The present application claims priority under 35 U.S.C. § 119(a) to Korean application number 10-2023-0049682, filed in the Korean Intellectual Property Office on Apr. 14, 2023, the entire disclosure of which is incorporated herein by reference.

BACKGROUND

The present disclosure relates to a semiconductor device in which an internal voltage is generated through the sharing of an amplifier circuit and a driver after the start of a standby operation and an active operation.

In general, a semiconductor memory device generates and uses an internal voltage that is necessary for an internal operation by receiving a power source voltage VDD and a ground voltage VSS from an external source. The internal voltage that is necessary for the semiconductor memory device includes a core voltage VCORE that is supplied to a memory core circuit, a high voltage VPP that is used to drive a word line or that is used when the semiconductor memory device is over-driven, and a back bias voltage VBB that is supplied as a bulk voltage of a transistor of a core circuit.

SUMMARY

In an embodiment, a semiconductor device may include: an internal voltage control circuit including an amplifier circuit and a plurality of drivers and configured to drive an internal voltage through the sharing of the amplifier circuit and a driver that is activated, among the plurality of drivers, after the start of a standby operation and an active operation; and a core circuit including a plurality of banks and configured to perform an operation of a bank that is activated, among the plurality of banks, by receiving the internal voltage.

Furthermore, in an embodiment, a semiconductor device may include: an amplifier circuit configured to drive an internal voltage after the start of a standby operation and an active operation and configured to adjust an amount of current based on a first driving control signal and a second driving control signal; and a driving circuit including a first driver and a second driver. The driving circuit is configured to: drive the internal voltage through the first driver by receiving a supply voltage when the first driving control signal is enabled after the start of the active operation; and to drive the internal voltage through the second driver by receiving the supply voltage when the second driving control signal is enabled after the start of the active operation.

DETAILED DESCRIPTION

Figure 1:
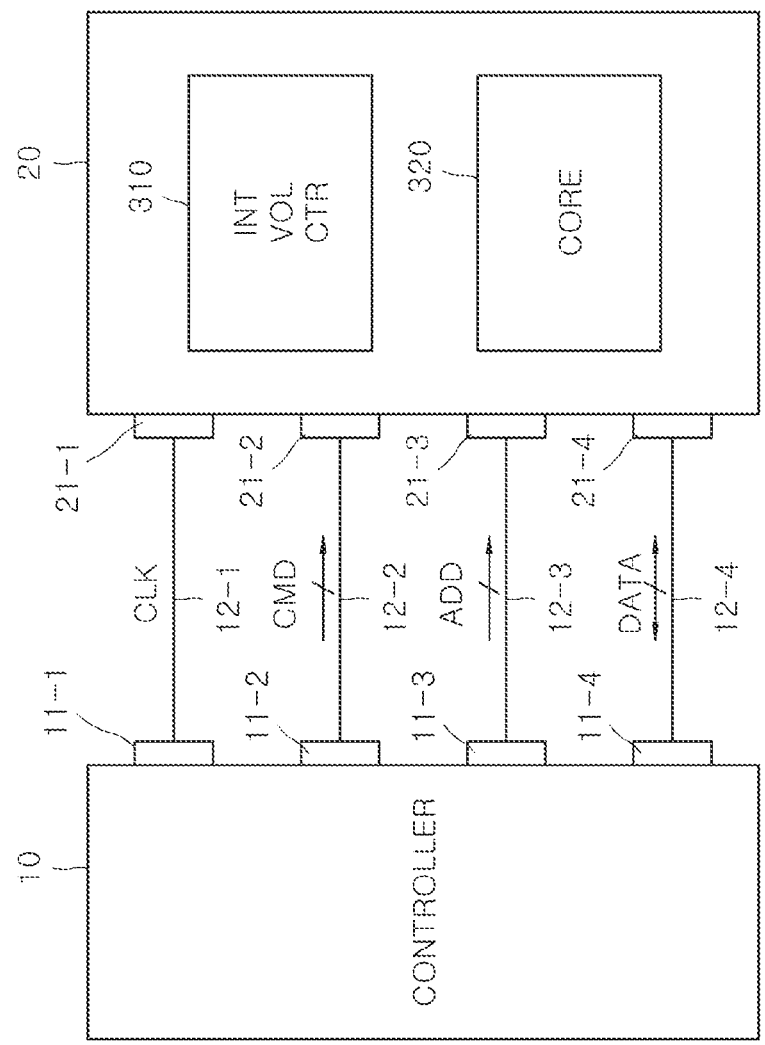
FIG. 1 is a block diagram illustrating a construction of a semiconductor system according to an embodiment of the present disclosure.

In the descriptions of the following embodiments, the term "preset" indicates that the numerical value of a parameter is previously determined, when the parameter is used in a process or algorithm. According to an embodiment, the numerical value of the parameter may be set when the process or algorithm is started or while the process or algorithm is performed.

Terms such as "first" and "second," which are used to distinguish among various components, are not limited by the components. For example, a first component may be referred to as a second component, and vice versa. These terms are not intended to imply a number or order of components.

When one component is referred to as being "coupled" or "connected" to another component, it should be understood that the components may be directly coupled or connected to each other or coupled or connected to each other through another component interposed therebetween. In contrast, when one component is referred to as being "directly coupled" or "directly connected" to another component, it should be understood that the components are directly coupled or connected to each other without another component interposed therebetween.

A "logic high level" and a "logic low level" are used to describe the logic levels of signals. A signal having a "logic high level" is distinguished from a signal having a "logic low level." For example, when a signal having a first voltage corresponds to a signal having a "logic high level," a signal having a second voltage may correspond to a signal having a "logic low level." According to an embodiment, a "logic high level" may be set to a voltage higher than a "logic low level." According to an embodiment, the logic levels of signals may be set to different logic levels or opposite logic levels. For example, a signal having a logic high level may be set to have a logic low level in some embodiments, and a signal having a logic low level may be set to have a logic high level in some embodiments.

Hereafter, the present disclosure will be described in more detail through embodiments. The embodiments are only used to exemplify the present disclosure, and the scope of the present disclosure is not limited by the embodiments.

Various embodiments of the present disclosure are directed to a semiconductor device in which an internal voltage is generated through the sharing of an amplifier circuit and a driver after the start of a standby operation and an active operation.

According to the present disclosure, it is possible to reduce the area and current consumption of a semiconductor device because an internal voltage is generated through the sharing of the amplifier circuit and the driver after the start of a standby operation and an active operation.

Furthermore, according to the present disclosure, it is possible to improve an operating speed and stability of the amplifier circuit by increasing the amount of current that is discharged from a node, through a current path of the amplifier circuit, after the start of a standby operation and an active operation.

Furthermore, according to the present disclosure, it is possible to generate an internal voltage through the sharing of the amplifier circuit and the driver after the start of a standby operation and an active operation and to perform an active operation, a refresh operation, a write operation, and a read operation by receiving the internal voltage.

As illustrated in FIG. 1, a semiconductor system 1 according to an embodiment of the present disclosure may include a controller 10 and a semiconductor device 20. The semiconductor device 20 may include an internal voltage control circuit (INT VOL CTR) 310 and a core circuit (CORE) 320.

The controller 10 may include a first control pin 11_1, a second control pin 112, a third control pin 11_3, and a fourth control pin 11_4. The semiconductor device 20 may include a first device pin 21_1, a second device pin 212, a third device pin 213, and a fourth device pin 21_4. A first transmission line 12_1 may be connected between the first control pin 11_1 and the first device pin 211. A second transmission line 12_2 may be connected between the second control pin 11_2 and the second device pin 21_2. A third transmission line 12_3 may be connected between the third control pin 11_3 and the third device pin 21_3. A fourth transmission line 12_4 may be connected between the fourth control pin 11_4 and the fourth device pin 21_4. The controller 10 may transmit a clock CLK for controlling the semiconductor device 20 to the semiconductor device 20 through the first transmission line 12_1. The controller 10 may transmit a command CMD for controlling the semiconductor device 20 to the semiconductor device 20 through the second transmission line 12_2. The controller 10 may transmit an address ADD for controlling the semiconductor device 20 to the semiconductor device 20 through the third transmission line 12_3. The controller 10 may output data DATA to the semiconductor device 20 or receive data DATA from the semiconductor device 20, through the fourth transmission line 12_4.

The controller 10 may output the clock CLK, the command CMD, and the address ADD for performing a standby operation to the semiconductor device 20. The controller 10 may output the clock CLK, the command CMD, and the address ADD for performing an active operation to the semiconductor device 20. The controller 10 may output the clock CLK, the command CMD, and the address ADD for performing a refresh operation to the semiconductor device 20. The controller 10 may output the clock CLK, the command CMD, the address ADD, and the data DATA for performing a write operation to the semiconductor device 20. The controller 10 may output the clock CLK, the command CMD, and the address ADD for performing a read operation to the semiconductor device 20, and may receive the data DATA from the semiconductor device 20.

Figure 12:
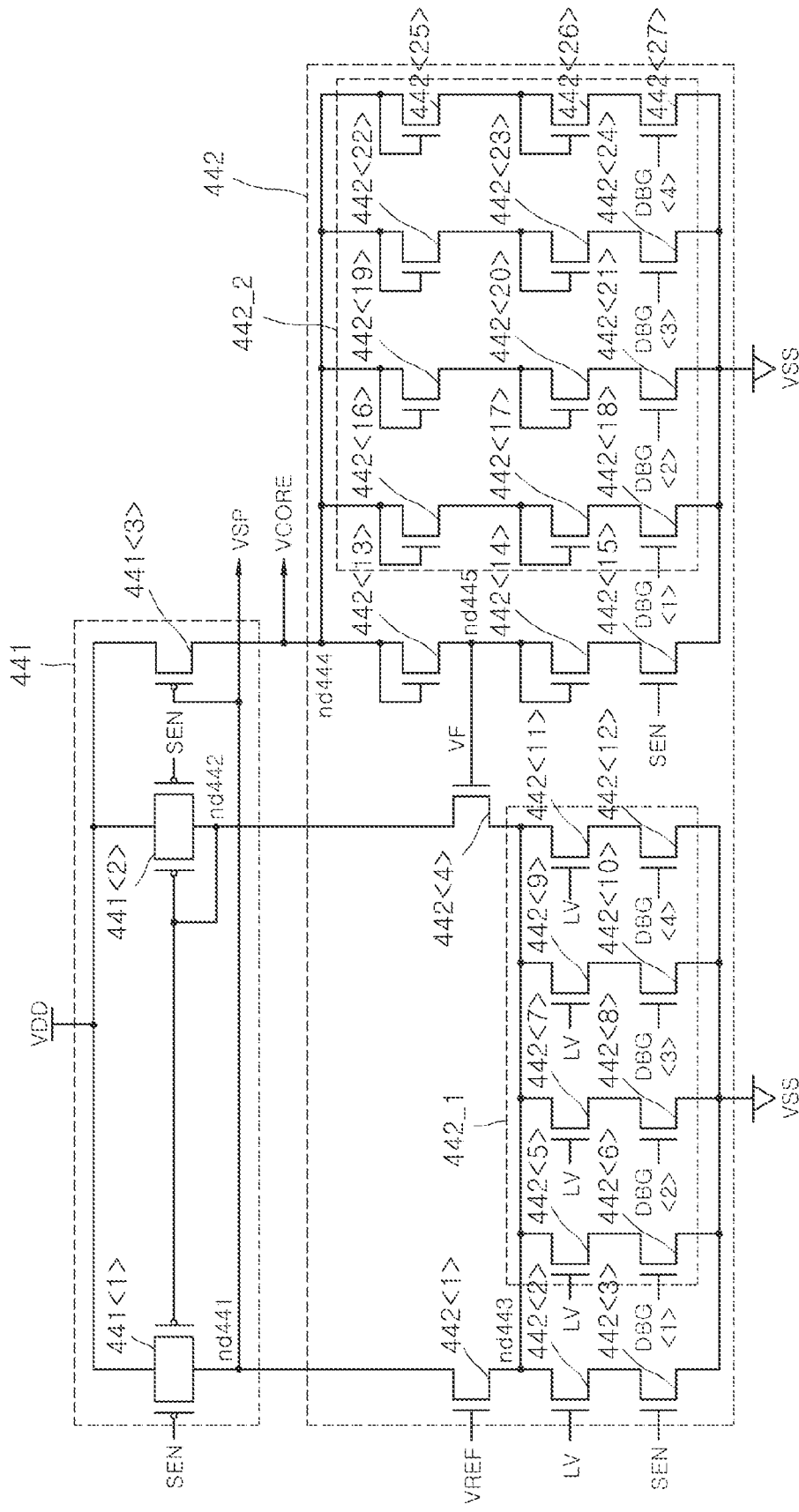
FIG. 12 is a circuit diagram illustrating a construction according to another embodiment of the amplifier circuit that is included in the internal voltage generation circuit illustrated in FIG. 8.
Figure 13:
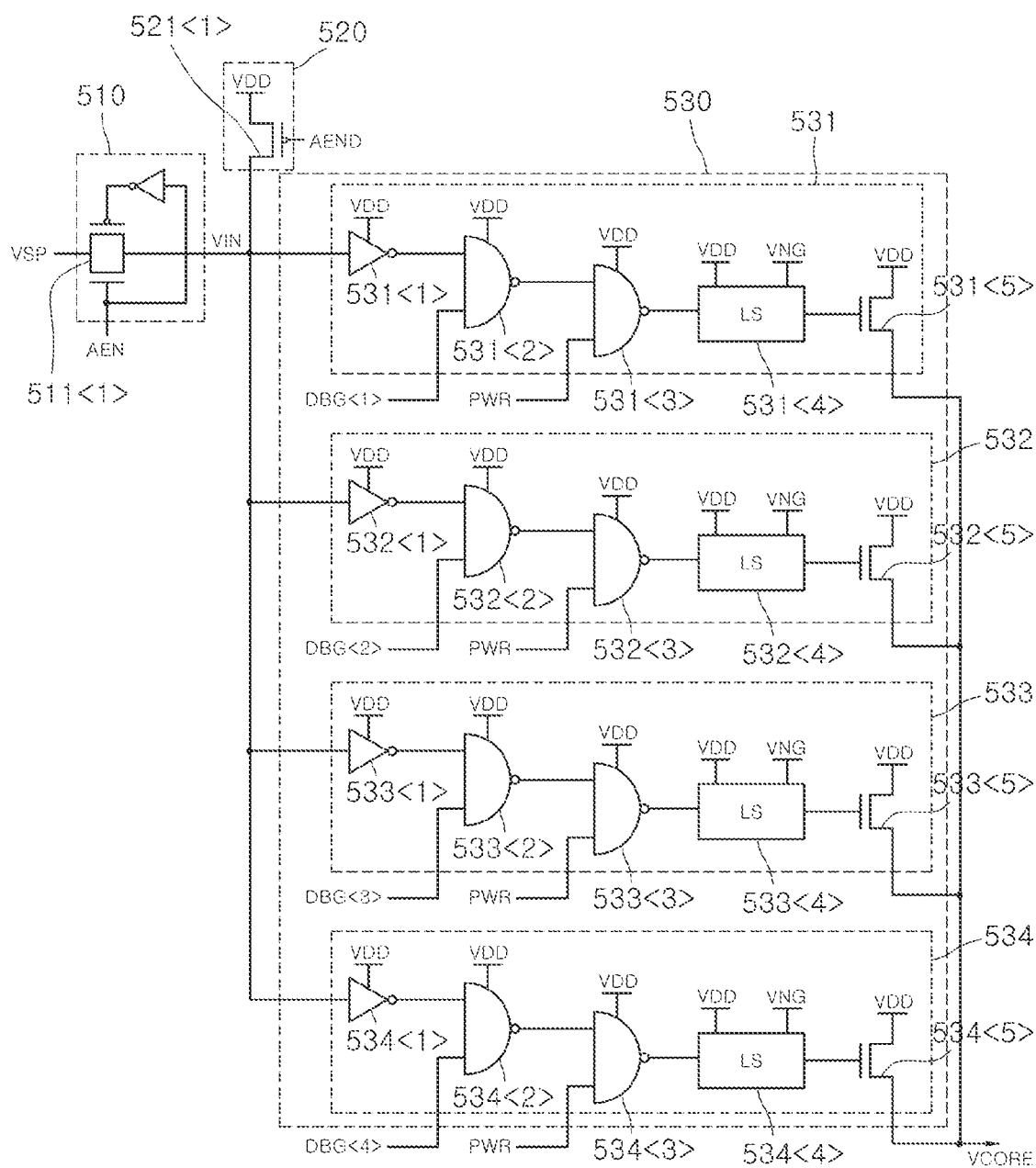
FIG. 13 is a diagram illustrating a construction according to an embodiment of a driving circuit that is included in the internal voltage generation circuit illustrated in FIG. 8.

The internal voltage control circuit 310 may include an amplifier circuit (313_1a, 313_1b, 313_1c, and 313_1d in FIGS. 9 to 12) and a plurality of drivers (531, 532, 533, and 534 in FIG. 13). The internal voltage control circuit 310 may drive an internal voltage (VCORE in FIGS. 3 and 9 to 13) through the sharing of the amplifier circuit (313_1a, 313_1b, 313_1c, and 313_1d in FIGS. 9 to 12) and a driver that that is activated, among the plurality of drivers (531, 532, 533, and 534 in FIG. 13), after the start of a standby operation and an active operation.

Figure 2:
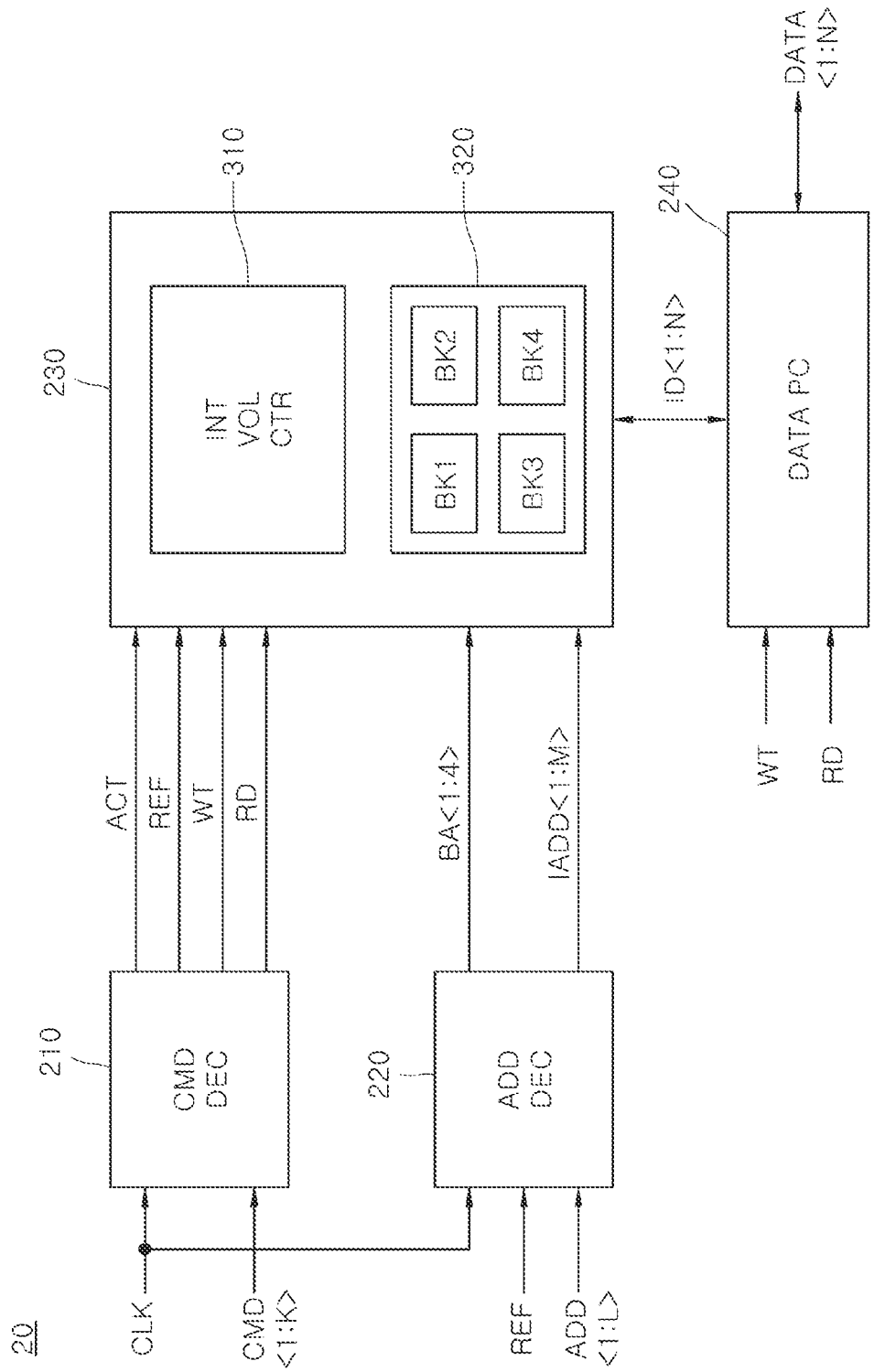
FIG. 2 is a block diagram illustrating a construction according to an embodiment of a semiconductor device that is included in the semiconductor system illustrated in FIG. 1.

The core circuit 320 may include a plurality of banks (BK1, BK2, BK3, and BK4 in FIG. 2). The core circuit 320 may perform an operation of a bank that is activated, among the plurality of banks (BK1, BK2, BK3, and BK4 in FIG. 2), by receiving the internal voltage (VCORE in FIGS. 3 and 9 to 13). The core circuit 320 may perform a standby operation, active operation, refresh operation, write operation, and read operation of a bank that is activated, among the plurality of banks (BK1, BK2, BK3, and BK4 in FIG. 2), by receiving the internal voltage (VCORE in FIGS. 3 and 9 to 13).

The semiconductor system 1 may generate the internal voltage (VCORE in FIGS. 3 and 9 to 13) through the sharing of the amplifier circuit (313_1a, 313_1b, 313_1c, and 313_1d in FIGS. 9 to 12) and a driver that is activated, among the plurality of drivers (531, 532, 533, and 534 in FIG. 13), after the start of a standby operation and an active operation. The semiconductor system 1 may perform a standby operation, active operation, refresh operation, write operation, and read operation of a bank that is activated, among the plurality of banks (BK1, BK2, BK3, and BK4 in FIG. 2), by receiving the internal voltage (VCORE in FIGS. 3 and 9 to 13).

As illustrated in FIG. 2, the semiconductor device 20 may include a command decoder (CMD DEC) 210, an address decoder (ADD DEC) 220, a memory circuit 230, and a data processing circuit (DATA PC) 240.

The command decoder 210 may generate an active command ACT, a refresh command REF, a write command WT, and a read command RD, based on first to k-th commands CMD<1:K>, in synchronization with the clock CLK. The command decoder 210 may generate the active command ACT including a pulse that is generated when the first to k-th commands CMD<1:K> that are input in synchronization with the clock CLK have a logic level combination for performing an active operation. The command decoder 210 may generate the refresh command REF including a pulse that is generated when the first to k-th commands CMD<1:K> that are input in synchronization with the clock CLK have a logic level combination for performing a refresh operation. The command decoder 210 may generate the write command WT including a pulse that is generated when the first to k-th commands CMD<1:K> that are input in synchronization with the clock CLK have a logic level combination for performing a write operation. The command decoder 210 may generate the read command RD including a pulse that is generated when the first to k-th commands CMD<1:K> that are input in synchronization with the clock CLK have a logic level combination for performing a read operation. The number "K" of bits of the first to k-th commands CMD<1:K> may be set as a positive integer.

The address decoder 220 may generate first to fourth bank addresses BA<1:4> and first to M-th internal addresses IADD<1:M>, based on first to L-th addresses ADD<1:L> in synchronization with the clock CLK. The address decoder 220 may generate the first to fourth bank addresses BA<1:4> and the first to M-th internal addresses IADD<1:M> by decoding the first to L-th addresses ADD<1:L> that are input in synchronization with the clock CLK. The address decoder 220 may generate the first to fourth bank addresses BA<1:4> that are sequentially enabled when a refresh command REF is enabled. The address decoder 220 may generate the first to fourth bank addresses BA<1:4> at least two of which are enabled when the refresh command REF is enabled. The address decoder 220 may generate the first to M-th internal addresses IADD<1:M> that are sequentially enabled when the refresh command REF is enabled.

The first bank address BA<1> may be set as a signal for activating a first bank BK1. The second bank address BA<2> may be set as a signal for activating a second bank BK2. The third bank address BA<3> may be set as a signal for activating a third bank BK3. The fourth bank address BA<4> may be set as a signal for activating a fourth bank BK4. The first to M-th internal addresses IADD<1:M> may be set as a signal for selectively activating a plurality of word lines and a plurality of bit lines of a bank that is activated, among the first to fourth banks BK1, BK2, BK3, and BK4. The number "L" of bits of the first to L-th addresses ADD<1:L> may be set as a positive integer. The number "M" of bits of the first to M-th internal addresses IADD<1:M> may be set as a positive integer.

The memory circuit 230 may include the internal voltage control circuit 310 and the core circuit 320.

The internal voltage control circuit 310 may include the amplifier circuit (313_1a, 313_1b, 313_1c, and 313_1d in FIGS. 9 to 12) and the plurality of drivers (531, 532, 533, and 534 in FIG. 13). The internal voltage control circuit 310 may drive the internal voltage (VCORE in FIGS. 3 and 9 to 13) through the sharing of the amplifier circuit (313_1a, 313_1b, 313_1c, and 313_1d in FIGS. 9 to 12) and a driver that is activated, among the plurality of drivers (531, 532, 533, and 534 in FIG. 13), after the start of a standby operation and an active operation.

The core circuit 320 may include the first to fourth banks BK1, BK2, BK3, and BK4. The core circuit 320 may perform an operation of a bank that is activated, among the first to fourth banks BK1, BK2, BK3, and BK4, by receiving the internal voltage (VCORE in FIGS. 3 and 9 to 13). The core circuit 320 may perform a standby operation, active operation, refresh operation, write operation, and read operation of a bank that is activated, among the first to fourth banks BK1, BK2, BK3, and BK4, by receiving the internal voltage (VCORE in FIGS. 3 and 9 to 13). The core circuit 320 may be implemented to include a control circuit (not illustrated) for controlling the standby operation, active operation, refresh operation, write operation, and read operation of the bank.

The first bank BK1 may be activated when the first bank address BA<1> is enabled, and may perform a standby operation, an active operation, a refresh operation, a write operation, and a read operation based on the first to M-th internal addresses IADD<1:M> by receiving the internal voltage (VCORE in FIGS. 3 and 9 to 13). The second bank BK2 may be activated when the second bank address BA<2> is enabled, and may perform a standby operation, an active operation, a refresh operation, a write operation, and a read operation based on the first to M-th internal addresses IADD<1:M> by receiving the internal voltage (VCORE in FIGS. 3 and 9 to 13). The third bank BK3 may be activated when the third bank address BA<3> is enabled, and may perform a standby operation, an active operation, a refresh operation, a write operation, and a read operation based on the first to M-th internal addresses IADD<1:M> by receiving the internal voltage (VCORE in FIGS. 3 and 9 to 13). The fourth bank BK4 may be activated when the fourth bank address BA<4> is enabled, and may perform a standby operation, an active operation, a refresh operation, a write operation, and a read operation based on the first to M-th internal addresses IADD<1:M> by receiving the internal voltage (VCORE in FIGS. 3 and 9 to 13). The standby operation may be set as an operation for reducing power consumption in a power-up operation. The active operation may be set as an operation for activating a plurality of word lines that is included in an activated bank. The refresh operation may be set as a common refresh operation of activating a plurality of word lines as the first to fourth banks BK1, BK2, BK3, and BK4 are sequentially activated. The refresh operation may be set as a same-bank refresh operation of activating a plurality of word lines as at least two of the first to fourth banks BK1, BK2, BK3, and BK4 are activated. The write operation may be set as an operation of storing first to N-th internal data ID<1:N> in a bank that is activated, among the first to fourth banks BK1, BK2, BK3, and BK4. The read operation may be set as an operation of outputting the first to N-th internal data ID<1:N> that have been stored in a bank that is activated, among the first to fourth banks BK1, BK2, BK3, and BK4.

The data processing circuit 240 may generate the first to N-th internal data ID<1:N> by receiving first to N-th data DATA<1:N> from the controller 10, after the start of a write operation. The data processing circuit 240 may generate the first to N-th internal data ID<1:N> by aligning and parallelizing the first to N-th data DATA<1:N> that are input in series when the write command WT is enabled. The data processing circuit 240 may output the first to N-th internal data ID<1:N> to the core circuit 320 when the write command WT is enabled. The data processing circuit 240 may generate the first to N-th data DATA<1:N> by receiving the first to N-th internal data ID<1:N> from the core circuit 320, after the start of a read operation. The data processing circuit 240 may generate the first to N-th data DATA<1:N> by aligning and serializing the first to N-th internal data ID<1:N> that are input in parallel when the read command RD is enabled. The data processing circuit 240 may output the first to N-th data DATA<1:N> to the controller 10 when the read command RD is enabled.

The semiconductor device 20 may generate the internal voltage (VCORE in FIGS. 3 and 9 to 13) through the sharing of the amplifier circuit (313_1a, 313_1b, 313_1c, and 313_1d in FIGS. 9 to 12) and a driver that is activated, among the plurality of drivers (531, 532, 533, and 534 in FIG. 13), after the start of a standby operation and an active operation. The semiconductor device 20 may perform a standby operation, an active operation, a refresh operation, a write operation, and a read operation of a bank that is activated, among the plurality of banks (BK1, BK2, BK3, and BK4 in FIG. 2), by receiving the internal voltage (VCORE in FIGS. 3 and 9 to 13).

Figure 3:
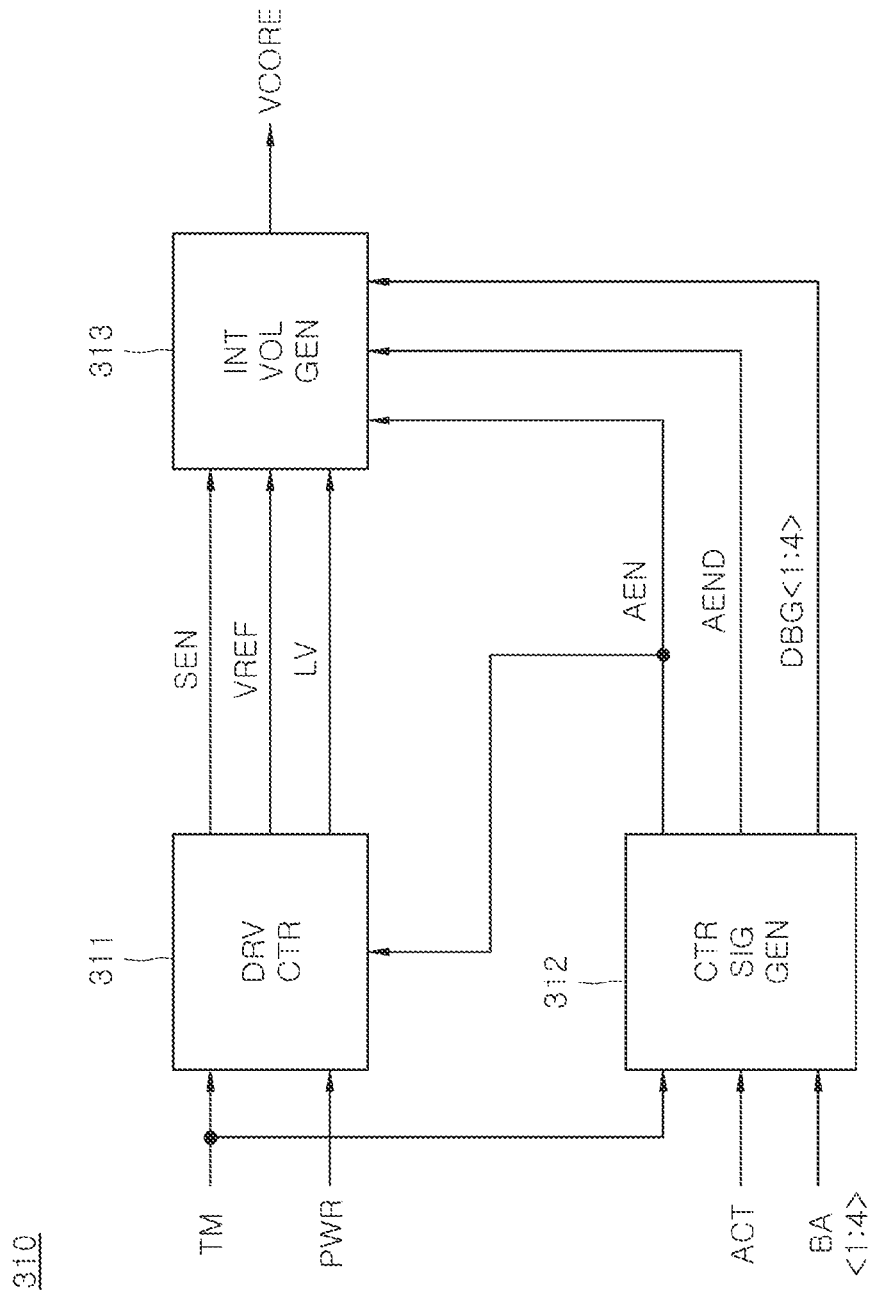
FIG. 3 is a block diagram illustrating a construction according to an embodiment of an internal voltage control circuit that is included in a memory circuit illustrated in FIG. 2.

FIG. 3 is a block diagram illustrating a construction according to an embodiment of the internal voltage control circuit 310 that is included in the semiconductor device 20. The internal voltage control circuit 310 may include a driving control circuit (DRV CTR) 311, a control signal generation circuit (CTR SIG GEN) 312, and an internal voltage generation circuit (INT VOL GEN) 313.

The driving control circuit 311 may generate a standby enable signal SEN, a reference voltage VREF, and a level voltage LV, based on a test mode signal TM, a power-up signal PWR, and an active enable signal AEN. The driving control circuit 311 may generate the standby enable signal SEN by inverting the test mode signal TM. The test mode signal TM may be set as a signal for performing a standby operation. The driving control circuit 311 may generate the reference voltage VREF having a predetermined voltage level, when the power-up signal PWR is enabled after a power-up operation. The power-up operation may be set as an operation of the voltage level of an external voltage that is supplied to the semiconductor device 20 rising to a set voltage level. The power-up signal PWR may be set as a signal that is enabled when a power-up operation is completed. The driving control circuit 311 may generate the level voltage LV having a voltage level for optimizing an operation of the amplifier circuit (313_1a, 313_1b, 313_1c, and 313_1d in FIGS. 9 to 12), based on the reference voltage VREF.

The control signal generation circuit 312 may generate the active enable signal AEN, an active delay signal AEND, and first to fourth driving control signals DBG<1:4>, based on the test mode signal TM, the active command ACT, and the first to fourth bank addresses BA<1:4>. The control signal generation circuit 312 may generate the first to fourth driving control signals DBG<1:4> based on the first to fourth bank addresses BA<1:4> when the active command ACT is enabled. The control signal generation circuit 312 may generate the active enable signal AEN and the active delay signal AEND that are enabled, when at least any one of the first to fourth bank addresses BA<1:4> is enabled and the test mode signal TM is disabled.

The internal voltage generation circuit 313 may drive the internal voltage VCORE in response to the voltage levels of the reference voltage VREF and the level voltage LV when the standby enable signal SEN is enabled. The internal voltage generation circuit 313 may drive the internal voltage VCORE based on the first to fourth driving control signals DBG<1:4>, when the active enable signal AEN and the active delay signal AEND are enabled.

Figure 4:
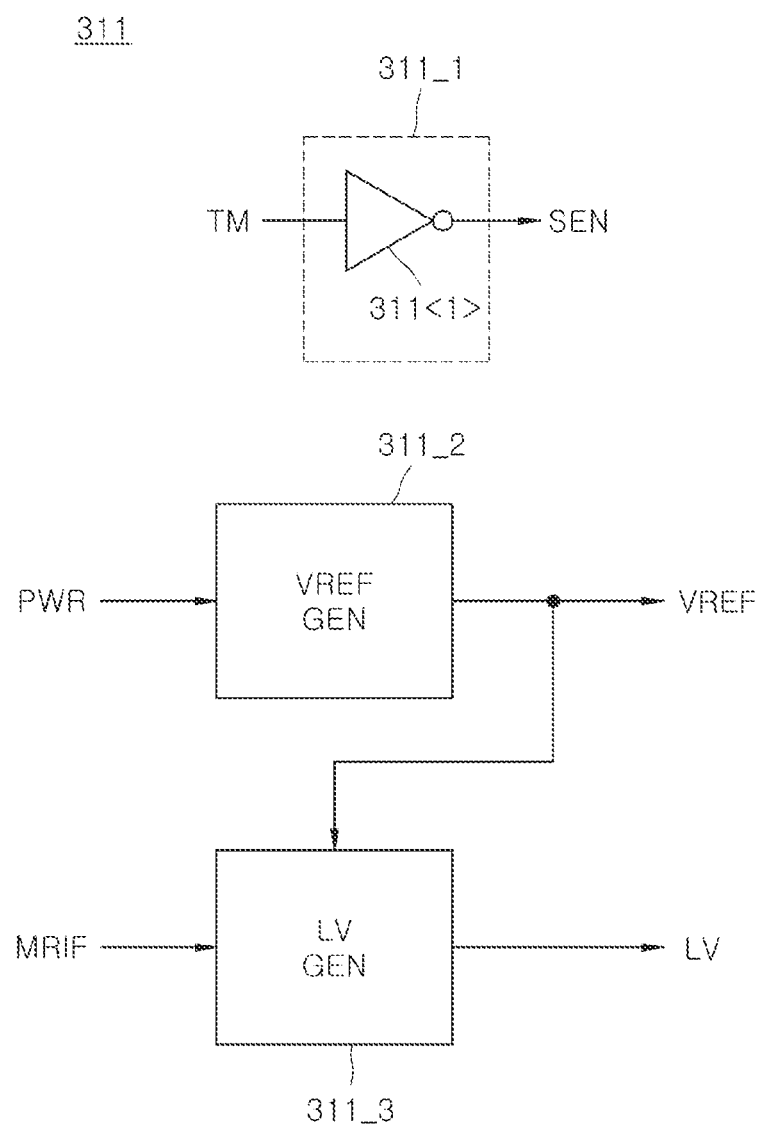
FIG. 4 is a diagram illustrating a construction according to an embodiment of a driving control circuit that is included in the internal voltage control circuit illustrated in FIG. 3.

FIG. 4 is a diagram illustrating a construction according to an embodiment of the driving control circuit 311 that is included in the internal voltage control circuit 310. The driving control circuit 311 may include a standby enable signal generation circuit 311_1, a reference voltage generation circuit (VREF GEN) 311_2, and a level voltage generation circuit (LV GEN) 3113.

The standby enable signal generation circuit 311_1 may be implemented by an inverter 311<1>. The standby enable signal generation circuit 311_1 may generate the standby enable signal SEN by inverting the test mode signal TM.

The reference voltage generation circuit 311_2 may generate the reference voltage VREF having a predetermined voltage level, when the power-up signal PWR is enabled after a power-up operation. The reference voltage generation circuit 311_2 may be implemented as a common Widlar circuit, and may generate the reference voltage VREF having a predetermined voltage level.

The level voltage generation circuit 3113 may generate the level voltage LV the voltage level of which is set based on the reference voltage VREF and mode information MRIF. The level voltage generation circuit 311_3 may generate the level voltage LV the voltage level of which is set based on the mode information MRIF, including information for optimizing an operation of the amplifier circuit (313_1a, 313_1b, 313_1c, and 313_1d in FIGS. 9 to 12), by receiving the reference voltage VREF. The mode information MRIF may be set as a signal that is stored in and output from a mode register set (MRS) that is provided in the semiconductor device 20.

Figure 5:
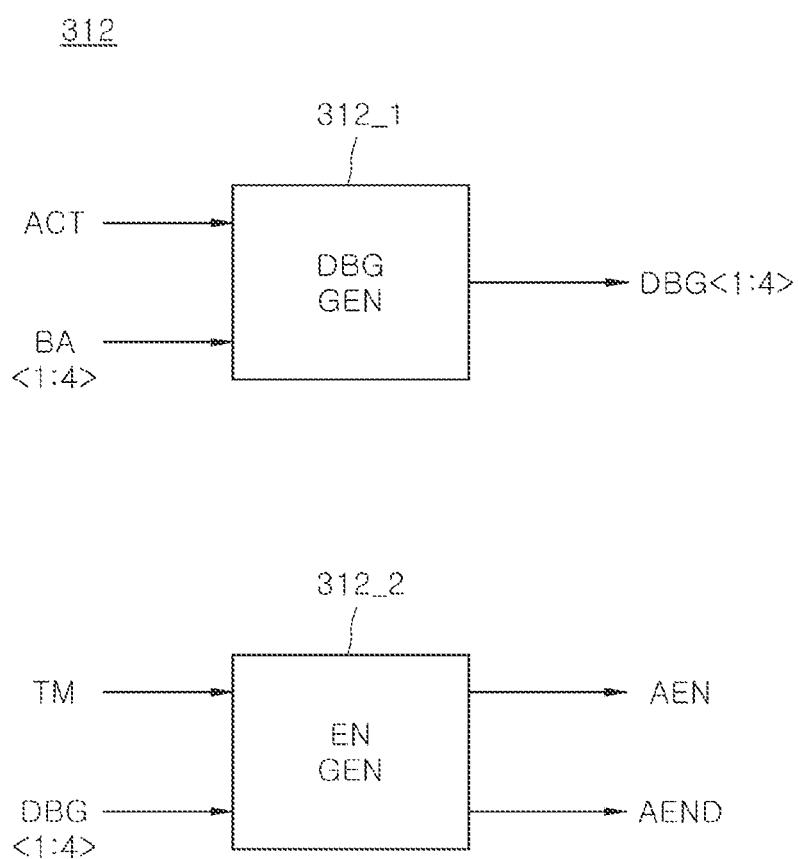
FIG. 5 is a block diagram illustrating a construction according to an embodiment of a control signal generation circuit that is included in the internal voltage control circuit illustrated in FIG. 3.

FIG. 5 is a block diagram illustrating a construction according to an embodiment of the control signal generation circuit 312 that is included in the internal voltage control circuit 310. The control signal generation circuit 312 may include a driving control signal generation circuit (DBG GEN) 3121 and an enable signal generation circuit (EN GEN) 312_2.

The driving control signal generation circuit 312_1 may generate the first to fourth driving control signals DBG<1:4>, based on the active command ACT and the first to fourth bank addresses BA<1:4>. The driving control signal generation circuit 312_1 may generate the first to fourth driving control signals DBG<1:4> based on the first to fourth bank addresses BA<1:4> when the active command ACT is enabled. The driving control signal generation circuit 312_1 may generate the first to fourth driving control signals DBG<1:4> by buffering the first to fourth bank addresses BA<1:4>, when the active command ACT is enabled.

The enable signal generation circuit 3122 may generate the active enable signal AEN and the active delay signal AEND that are sequentially enabled, when at least any one of the first to fourth bank addresses BA<1:4> is enabled and the test mode signal TM is disabled. The enable signal generation circuit 3122 may generate the active enable signal AEN that is enabled, when at least any one of the first to fourth bank addresses BA<1:4> is enabled and the test mode signal TM is disabled. The enable signal generation circuit 312_2 may generate the active delay signal AEND by buffering the active enable signal AEN.

Figure 6:
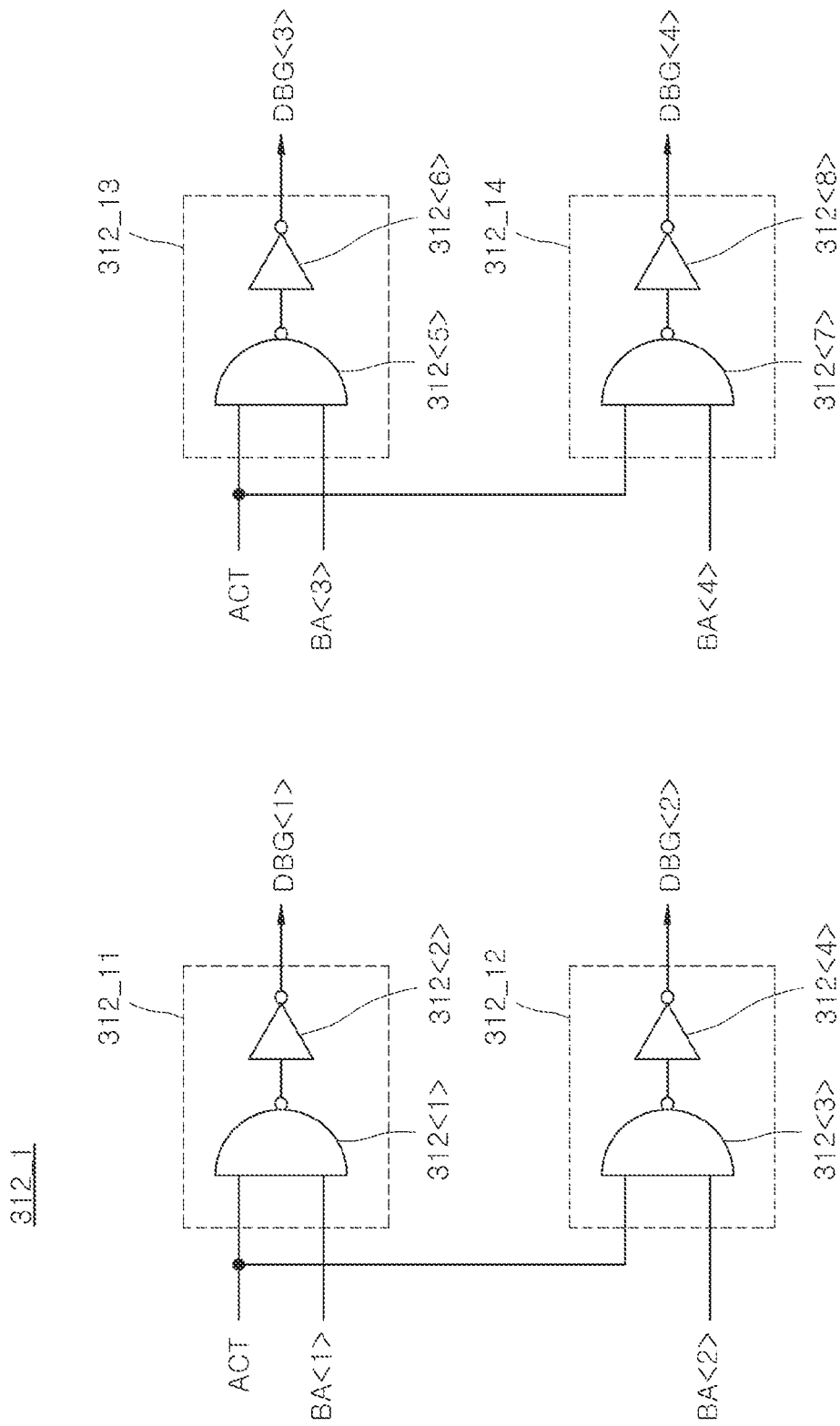
FIG. 6 is a circuit diagram illustrating a construction according to an embodiment of a driving control signal generation circuit that is included in the control signal generation circuit illustrated in FIG. 5.

FIG. 6 is a circuit diagram illustrating a construction according to an embodiment of the driving control signal generation circuit 312_1 that is included in the control signal generation circuit 312. The driving control signal generation circuit 312_1 may include a first logic circuit 312_11, a second logic circuit 312_12, a third logic circuit 312_13, and a fourth logic circuit 312_14.

The first logic circuit 312_11 may be implemented by an NAND gate 312<1> and an inverter 312<2>. The first logic circuit 312_11 may generate the first driving control signal DBG<1> by buffering the first bank address BA<1>, when the active command ACT is enabled to a logic high level.

The first logic circuit 312_11 may generate the first driving control signal DBG<1> that is disabled to a logic low level when the active command ACT is disabled to a logic low level.

The second logic circuit 312_12 may be implemented by an NAND gate 312<3> and an inverter 312<4>. The second logic circuit 312_12 may generate the second driving control signal DBG<2> by buffering the second bank address BA<2>, when the active command ACT is enabled to a logic high level. The second logic circuit 312_12 may generate the second driving control signal DBG<2> that is disabled to a logic low level when the active command ACT is disabled to a logic low level.

The third logic circuit 312_13 may be implemented by an NAND gate 312<5> and an inverter 312<6>. The third logic circuit 312_13 may generate the third driving control signal DBG<3> by buffering the third bank address BA<3>, when the active command ACT is enabled to a logic high level. The third logic circuit 312_13 may generate the third driving control signal DBG<3> that is disabled to a logic low level when the active command ACT is disabled to a logic low level.

The fourth logic circuit 312_14 may be implemented by an NAND gate 312<7> and an inverter 312<8>. The fourth logic circuit 312_14 may generate the fourth driving control signal DBG<4> by buffering the fourth bank address BA<4>, when the active command ACT is enabled to a logic high level. The fourth logic circuit 312_14 may generate the fourth driving control signal DBG<4> that is disabled to a logic low level when the active command ACT is disabled to a logic low level.

Figure 7:
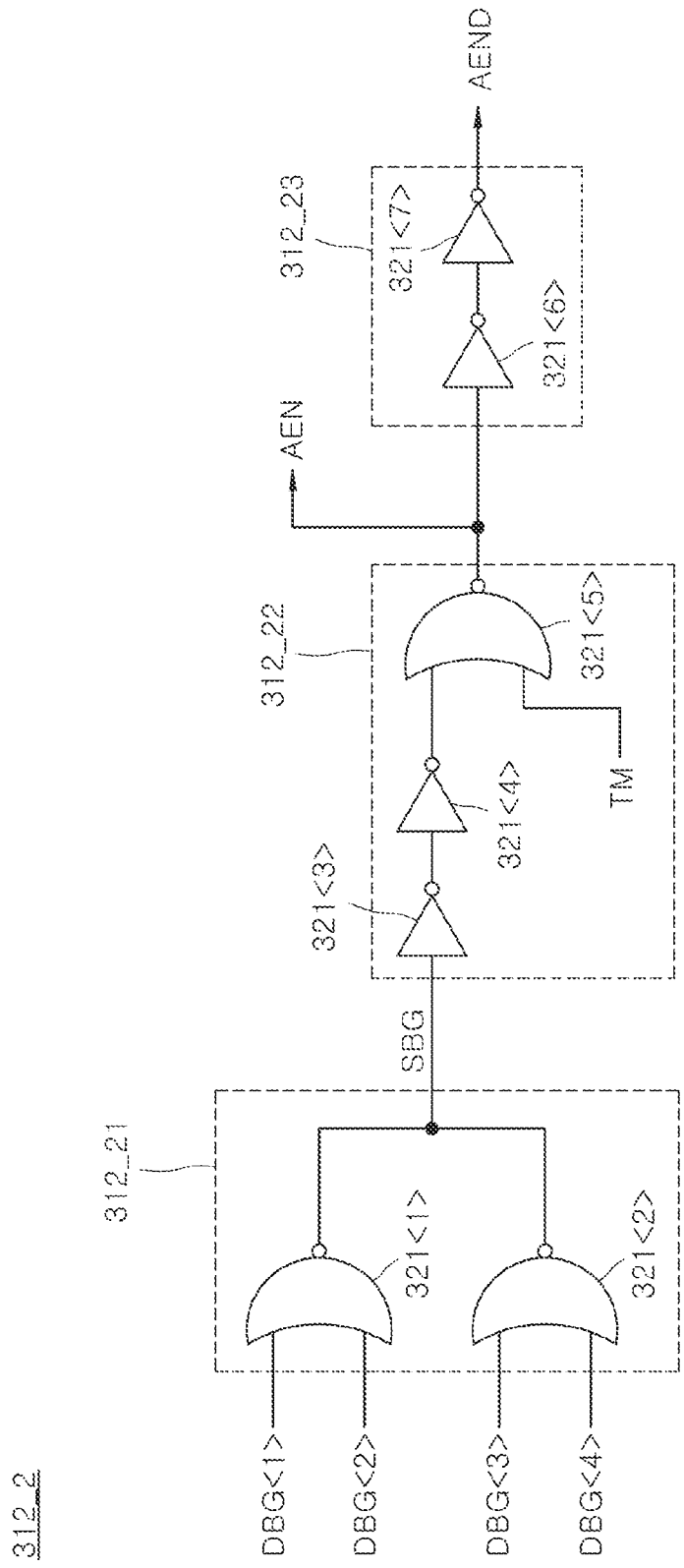
FIG. 7 is a circuit diagram illustrating a construction according to an embodiment of an enable signal generation circuit that is included in the control signal generation circuit illustrated in FIG. 5.

FIG. 7 is a circuit diagram illustrating a construction according to an embodiment of the enable signal generation circuit 312_2 that is included in the control signal generation circuit 312. The enable signal generation circuit 312_2 may include a synthesis driving control signal generation circuit 312_21, a first buffering circuit 312_22, and a second buffering circuit 312_23.

The synthesis driving control signal generation circuit 312_21 may be implemented by NOR gates 321<1> and 321<2>. The synthesis driving control signal generation circuit 312_21 may generate a synthesis driving control signal SBG that is enabled to a logic low level when at least any one of the first to fourth bank addresses BA<1:4> is enabled to a logic high level. The synthesis driving control signal generation circuit 312_21 may generate the synthesis driving control signal SBG that is disabled to a logic high level when all of the first to fourth bank addresses BA<1:4> are disabled to a logic low level.

The first buffering circuit 312_22 may be implemented by inverters 321<3> and 321<4> and a NOR gate 321<5>. The first buffering circuit 312_22 may generate the active enable signal AEN by inverting and buffering the synthesis driving control signal SBG when the test mode signal TM is disabled to a logic low level. The first buffering circuit 312_22 may generate the active enable signal AEN that is enabled to a logic high level, when the test mode signal TM is disabled to a logic low level and the synthesis driving control signal SBG is enabled to a logic low level.

The second buffering circuit 312_23 may be implemented by inverters 321<6> and 321<7>. The second buffering circuit 312_23 may generate the active delay signal AEND by buffering the active enable signal AEN. The second buffering circuit 312_23 may generate the active delay signal AEND that is enabled to a logic high level after a delay time of the inverters 321<6> and 321<7> when the active enable signal AEN is enabled to a logic high level.

Figure 8:
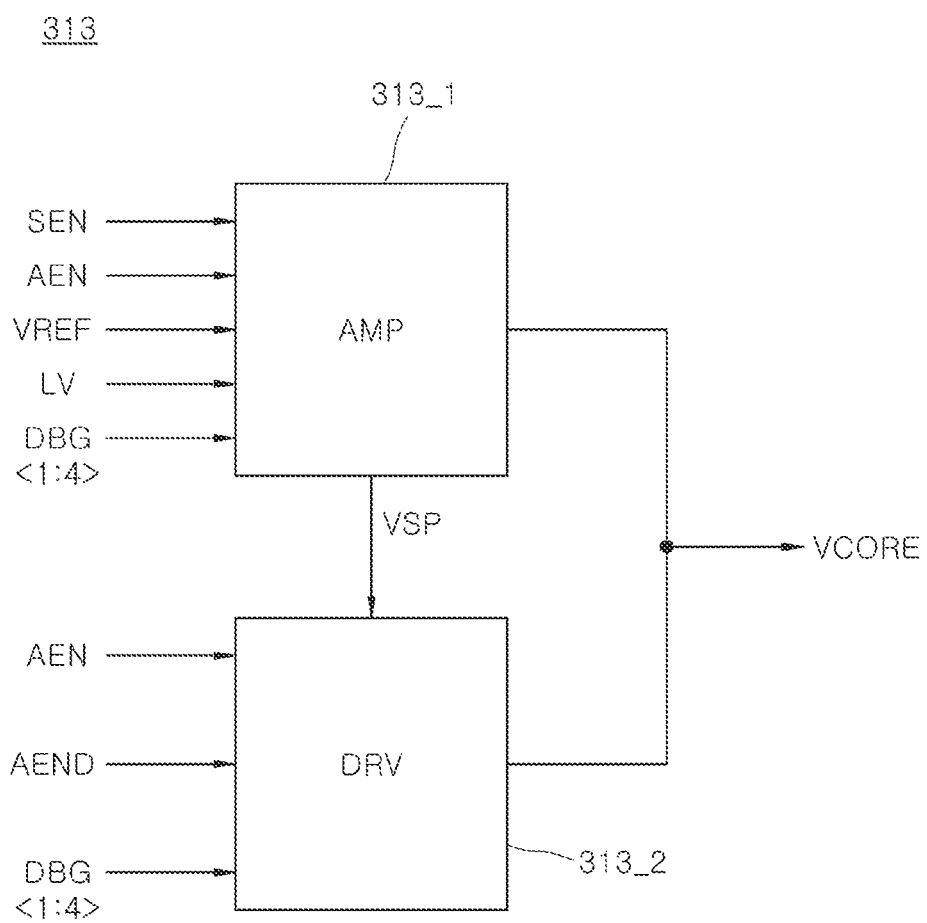
FIG. 8 is a block diagram illustrating a construction according to an embodiment of an internal voltage generation circuit that is included in the internal voltage control circuit illustrated in FIG. 3.

FIG. 8 is a block diagram illustrating a construction according to an embodiment of the internal voltage generation circuit 313 that is included in the internal voltage control circuit 310. The internal voltage generation circuit 313 may include an amplifier circuit (AMP) 3131 and a driving circuit (DRV) 313_2.

The amplifier circuit 313_1 may generate a supply voltage VSP from an external voltage (VDD in FIGS. 9 to 12) when the standby enable signal SEN is disabled to a logic low level. The amplifier circuit 313_1 may drive the internal voltage VCORE in response to the voltage levels of the reference voltage VREF and the level voltage LV, when the standby enable signal SEN is enabled to a logic high level. The amplifier circuit 313_1 may drive the internal voltage VCORE by forming a current path in response to the voltage levels of the active enable signal AEN, the first to fourth driving control signals DBG<1:4>, and the level voltage LV.

The driving circuit 313_2 may receive the supply voltage VSP when the active enable signal AEN and the active delay signal AEND are enabled to a logic high level. The driving circuit 313_2 may drive the internal voltage VCORE based on the first to fourth driving control signals DBG<1:4> by receiving the supply voltage VSP when the active enable signal AEN is enabled to a logic high level.

Figure 9:
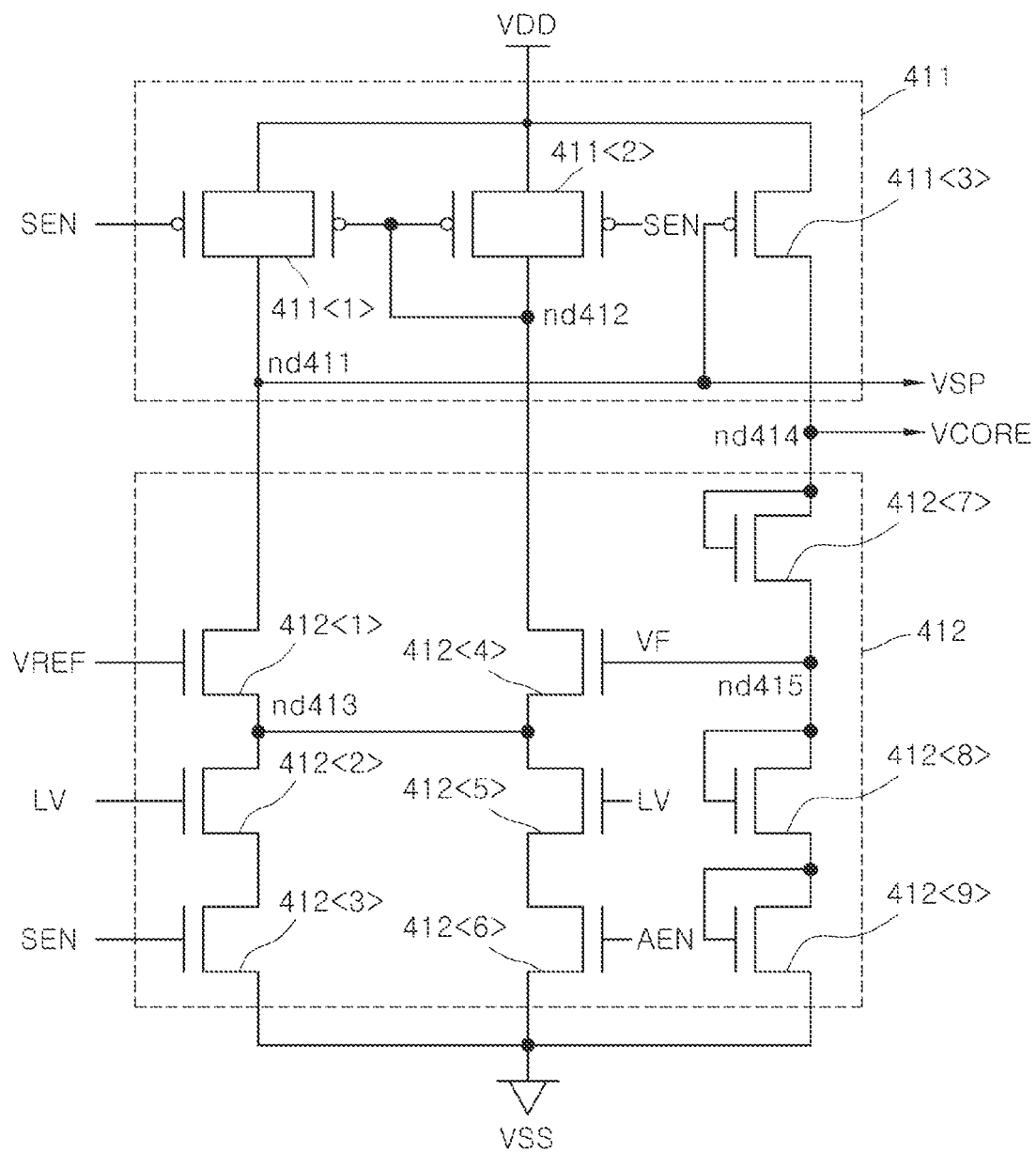
FIG. 9 is a circuit diagram illustrating a construction according to an embodiment of an amplifier circuit that is included in the internal voltage generation circuit illustrated in FIG. 8.

FIG. 9 is a circuit diagram illustrating a construction according to an embodiment of the amplifier circuit 313_1 that is included in the internal voltage generation circuit 313. An amplifier circuit 313_1a may include a current supply circuit 411 and a current discharge circuit 412.

The current supply circuit 411 may be implemented by a transfer gate 411<1> that is disposed between the external voltage VDD and a node nd411, a transfer gate 411<2> that is disposed between the external voltage VDD and a node nd412, and a PMOS transistor 411<3> that is disposed between the external voltage VDD and a node nd414. The current supply circuit 411 may generate the supply voltage VSP by receiving a current from the external voltage VDD through the node nd411, when the standby enable signal SEN is disabled to a logic low level. The node nd411 may be set as a node from which the supply voltage VSP is output. The current supply circuit 411 may increase the voltage level of the supply voltage VSP by receiving a lot of current through the node nd411 as the voltage level of the node nd412 is decreased. The current supply circuit 411 may drive the internal voltage VCORE from the external voltage VDD when the voltage level of the supply voltage VSP is generated as the voltage level of the ground voltage VSS.

The current discharge circuit 412 may include an NMOS transistor 412<1> that is disposed between the node nd411 and a node nd413, and an NMOS transistor 412<2> and an NMOS transistor 412<3> that are connected in series between the node nd413 and a ground voltage VSS. The current discharge circuit 412 may form a first current path through the NMOS transistor 412<1>, the NMOS transistor 412<2>, and the NMOS transistor 412<3>. The current discharge circuit 412 may drive the supply voltage VSP to the voltage level of the ground voltage VSS based on the amount of current that is discharged through the first current path, in response to the voltage levels of the reference voltage VREF and the level voltage LV when the standby enable signal SEN is enabled.

The current discharge circuit 412 may include an NMOS transistor 412<4> that is disposed between the node nd412 and the node nd413, and an NMOS transistor 412<5> and an NMOS transistor 412<6> that are connected in series between the node nd413 and the ground voltage VSS. The current discharge circuit 412 may form a second current path through the NMOS transistor 412<4>, the NMOS transistor 412<5>, and the NMOS transistor 412<6>. The current discharge circuit 412 may drive the supply voltage VSP to the voltage level of the ground voltage VS by discharging the current of the node nd412 through the second current path, in response to the voltage level of the level voltage LV when the active enable signal AEN is enabled. The current discharge circuit 412 may discharge the current of the node nd412 through the second current path in response to the voltage level of the level voltage LV when the active enable signal AEN is enabled. The current discharge circuit 412 may discharge the current of the node nd413 through the second current path in response to the voltage level of a feedback voltage VF when the active enable signal AEN is enabled.

The current discharge circuit 412 may include an NMOS transistor 412<7> that is disposed between the node nd414 and a node nd415 and that has a drain and a gate connected to each other, and an NMOS transistor 412<8> and an NMOS transistor 412<9> that are connected in series between the node nd415 and the ground voltage VSS and that have their drains and gates connected to each other. The current discharge circuit 412 may generate the feedback voltage VF by dividing the internal voltage VCORE through the NMOS transistor 412<7>, the NMOS transistor 412<8>, and the NMOS transistor 412<9>.

The amplifier circuit 313_1a according to an embodiment of the present disclosure may generate the internal voltage VCORE from the external voltage VDD after the start of a standby operation and an active operation. The amplifier circuit 313_1a can increase the amount of current that is discharged from a node through the first current path and the second current path, so that an operating speed and stability of the amplifier circuit 313_1a can be improved.

Figure 10:
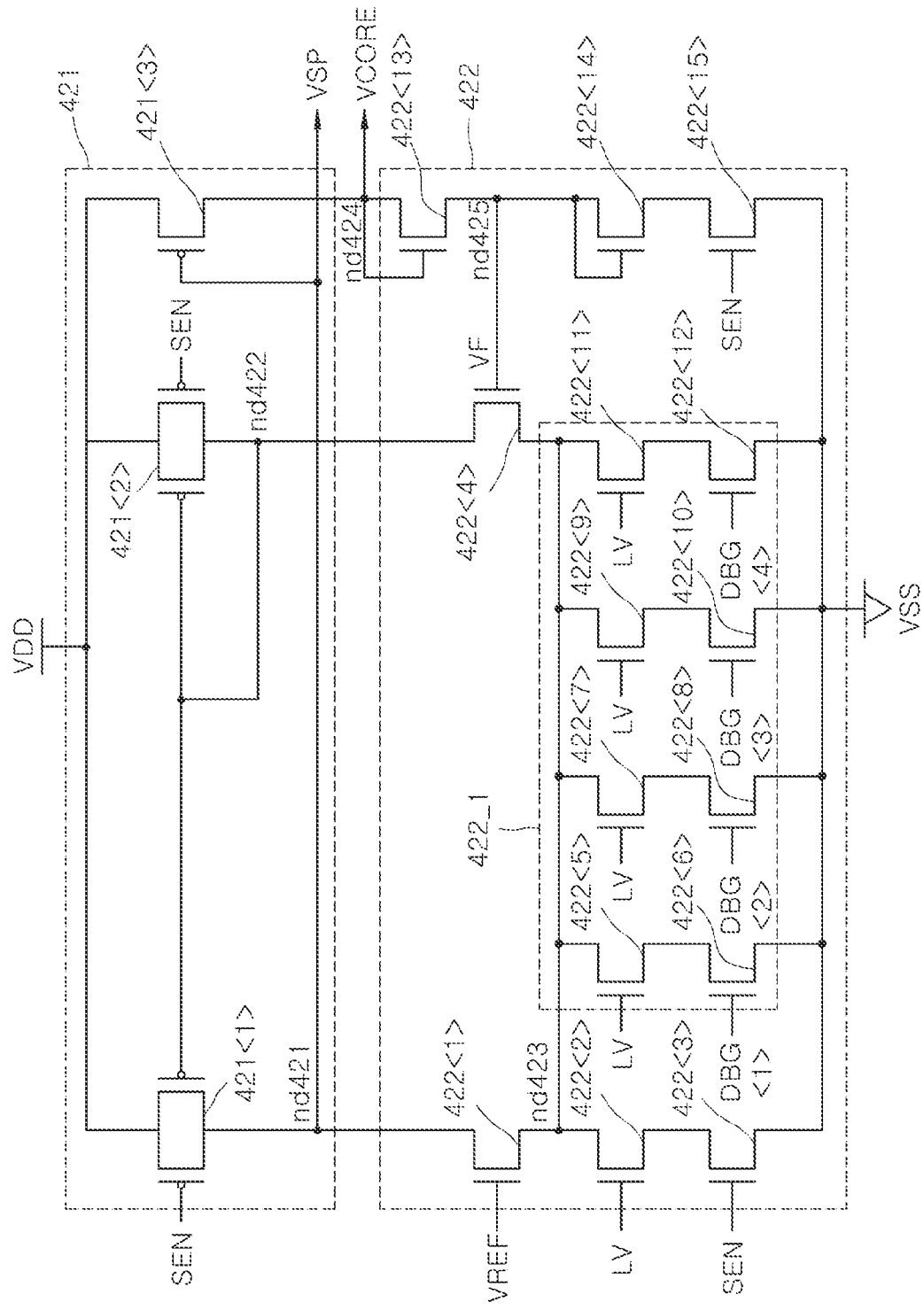
FIG. 10 is a circuit diagram illustrating a construction according to another embodiment of the amplifier circuit that is included in the internal voltage generation circuit illustrated in FIG. 8.

FIG. 10 is a circuit diagram illustrating a construction according to another embodiment of the amplifier circuit 313_1 that is included in the internal voltage generation circuit 313. The amplifier circuit 313_1b may include a current supply circuit 421 and a current discharge circuit 422.

The current supply circuit 421 may be implemented by a transfer gate 421<1> that is disposed between an external voltage VDD and a node nd421, a transfer gate 421<2> that is disposed between the external voltage VDD and a node nd422, and a PMOS transistor 421<3> that is disposed between the external voltage VDD and a node nd425. The current supply circuit 421 may generate a supply voltage VSP by receiving current from the external voltage VDD through the node nd421 when the standby enable signal SEN is disabled to a logic low level. The node nd421 may be set as a node from which the supply voltage VSP is output. The current supply circuit 421 may increase the voltage level of the supply voltage VSP by receiving a lot of a current through the node nd421 as the voltage level of the node nd422 is decreased. The current supply circuit 421 may drive the internal voltage VCORE from the external voltage VDD when the voltage level of the supply voltage VSP is generated as the voltage level of the ground voltage VSS.

The current discharge circuit 422 may include an NMOS transistor 422<1> that is disposed between the node nd421 and a node nd423, and an NMOS transistor 422<2> and an NMOS transistor 422<3> that are connected in series between the node nd423 and a ground voltage VSS. The current discharge circuit 422 may form a first current path through the NMOS transistor 422<1>, the NMOS transistor 422<2>, and the NMOS transistor 422<3>. The current discharge circuit 412 may drive the supply voltage VSP to the voltage level of the ground voltage VSS based on the amount of current that is discharged through the first current path, in response to the voltage levels of the reference voltage VREF and the level voltage LV when the standby enable signal SEN is enabled. The current discharge circuit 422 may include an NMOS transistor 422<4> that is disposed between the node nd422 and the node nd423. The NMOS transistor 422<4> may discharge the current of the node nd422 to the node nd423 in response to the voltage level of the feedback voltage VF.

The current discharge circuit 422 may include a current quantity adjustment circuit 422_1. The current quantity adjustment circuit 422_1 may include an NMOS transistor 422<5> and an NMOS transistor 422<6> that are connected in series between the node nd423 and the ground voltage VSS, an NMOS transistor 422<7> and an NMOS transistor 422<8> that are connected in series between the node nd423 and the ground voltage VSS, an NMOS transistor 422<9> and an NMOS transistor 422<10> that are connected in series between the node nd423 and the ground voltage VSS, and an NMOS transistor 422<11> and an NMOS transistor 422<12> that are connected in series between the node nd423 and the ground voltage VSS. The current quantity adjustment circuit 422_1 may form a second current path through the NMOS transistor 422<5>, the NMOS transistor 422<6>, the NMOS transistor 422<7>, the NMOS transistor 422<8>, the NMOS transistor 422<9>, the NMOS transistor 422<10>, the NMOS transistor 422<11>, and the NMOS transistor 422<12>.

The current quantity adjustment circuit 422_1 may discharge the current of the node nd423 through the second current path that is formed by the NMOS transistor 422<5> and the NMOS transistor 422<6>, in response to the voltage level of the level voltage LV when the first driving control signal DBG<1> is enabled to a logic high level. The current quantity adjustment circuit 422_1 may discharge the current of the node nd423 through the second current path that is formed by the NMOS transistor 422<7> and the NMOS transistor 422<8>, in response to the voltage level of the level voltage LV when the second driving control signal DBG<2> is enabled to a logic high level. The current quantity adjustment circuit 4221 may discharge the current of the node nd423 through the second current path that is formed by the NMOS transistor 422<9> and the NMOS transistor 422<10>, in response to the voltage level of the level voltage LV when the third driving control signal DBG<3> is enabled to a logic high level. The current quantity adjustment circuit 422_1 may discharge the current of the node nd423 through the second current path that is formed by the NMOS transistor 422<11> and the NMOS transistor 422<12>, in response to the voltage level of the level voltage LV when the fourth driving control signal DBG<4> is enabled to a logic high level. The current quantity adjustment circuit 422_1 may increase the amount of current that is discharged from the node nd423 through the second current path when the number of signals that are enabled, among the first to fourth driving control signals DBG<1:4>, is increased.

The current discharge circuit 422 may include an NMOS transistor 422<13> that is disposed between a node nd424 and the node nd425 and that has a drain and a gate connected to each other, and an NMOS transistor 422<14> and an NMOS transistor 422<15> that are connected in series between the node nd425 and the ground voltage VSS and that have their drains and gates connected to each other. The current discharge circuit 422 may generate a feedback voltage VF by dividing the internal voltage VCORE through the NMOS transistor 422<13>, the NMOS transistor 422<14>, and the NMOS transistor 422<15> when the standby enable signal SEN is enabled to a logic high level.

The amplifier circuit 313_1b according to an embodiment of the present disclosure may generate the internal voltage VCORE from the external voltage VDD after the start of a standby operation and an active operation. The amplifier circuit 313_1b can increase the amount of current that is discharged from a node through the first current path and the second current path, so that an operating speed and stability of the amplifier circuit 313_1b can be improved.

Figure 11:
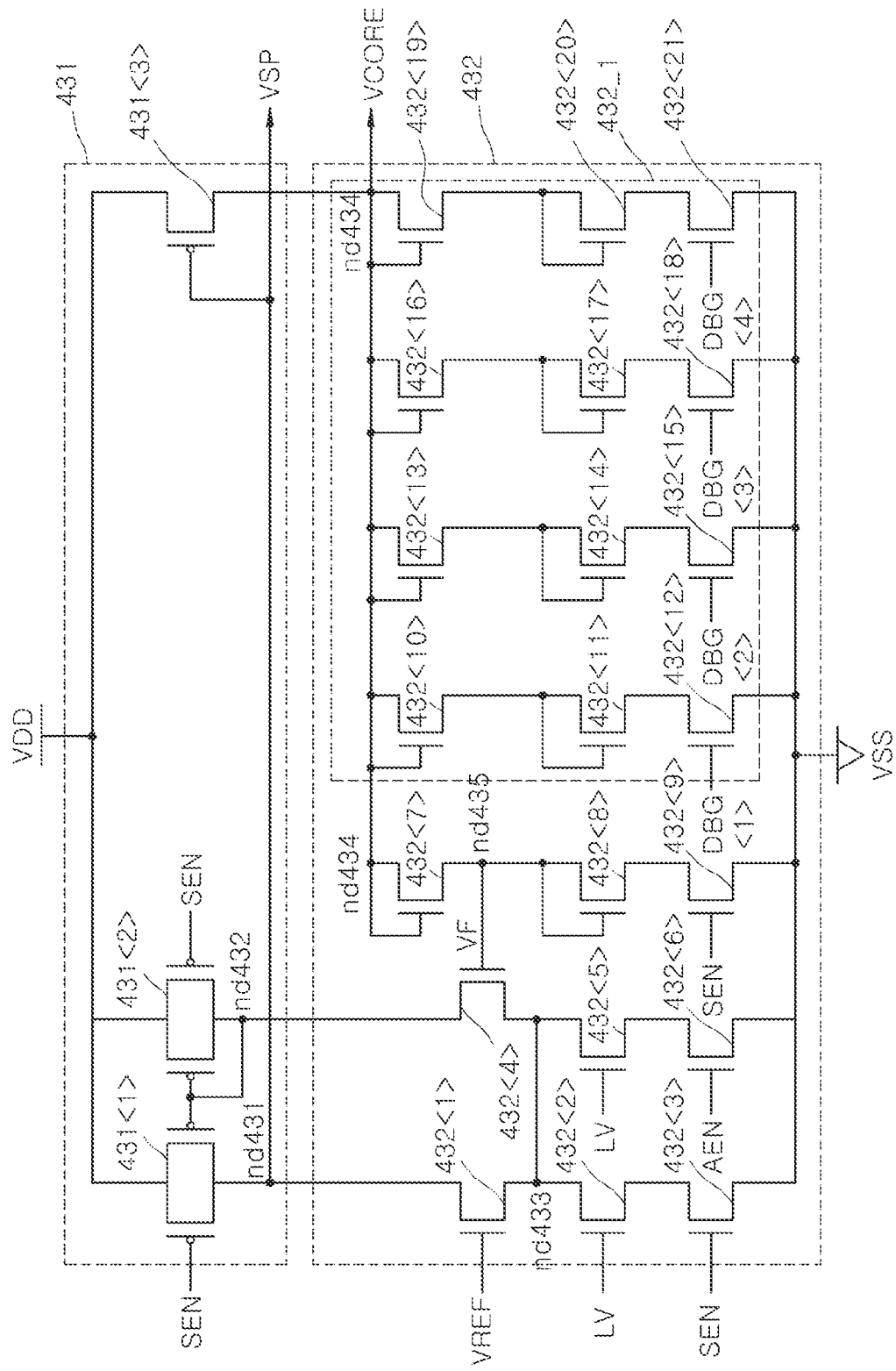
FIG. 11 is a circuit diagram illustrating a construction according to another embodiment of the amplifier circuit that is included in the internal voltage generation circuit illustrated in FIG. 8.

FIG. 11 is a circuit diagram illustrating a construction according to another embodiment of the amplifier circuit 313_1 that is included in the internal voltage generation circuit 313. The amplifier circuit 313_1c may include a current supply circuit 431 and a current discharge circuit 432.

The current supply circuit 431 may be implemented by a transfer gate 431<1> that is disposed between an external voltage VDD and a node nd431, a transfer gate 431<2> that is disposed between the external voltage VDD and a node nd432, and a PMOS transistor 431<3> that is disposed between the external voltage VDD and a node nd434. The current supply circuit 431 may generate a supply voltage VSP by receiving a current from the external voltage VDD through the node nd431 when the standby enable signal SEN is disabled to a logic low level. The node nd431 may be set as a node from which the supply voltage VSP is output. The current supply circuit 431 may increase the voltage level of the supply voltage VSP by receiving a lot of a current through the node nd431 as the voltage level of the node nd432 is decreased. The current supply circuit 431 may drive the internal voltage VCORE from the external voltage VDD when the voltage level of the supply voltage VSP is generated as the voltage level of a ground voltage VSS.

The current discharge circuit 432 may include an NMOS transistor 432<1> that is disposed between the node nd431 and a node nd433, and an NMOS transistor 432<2> and an NMOS transistor 432<3> that are connected in series between the node nd433 and a ground voltage VSS. The current discharge circuit 432 may form a first current path through the NMOS transistor 432<1>, the NMOS transistor 432<2>, and the NMOS transistor 432<3>. The current discharge circuit 432 may drive the supply voltage VSP to the voltage level of the ground voltage VSS based on the amount of current that is discharged through the first current path, in response to the voltage levels of the reference voltage VREF and the level voltage LV when the standby enable signal SEN is enabled.

The current discharge circuit 432 may include an NMOS transistor 432<4> that is disposed between the node nd432 and the node nd433, and an NMOS transistor 432<5> and an NMOS transistor 432<6> that are connected in series between the node nd433 and the ground voltage VSS. The current discharge circuit 432 may form a second current path through the NMOS transistor 432<4>, the NMOS transistor 432<5>, and the NMOS transistor 432<6>. The current discharge circuit 432 may drive the supply voltage VSP to the voltage level of the ground voltage VSS by discharging the currents of the nodes nd431 and nd433 through the second current path in response to the voltage level of the level voltage LV when the active enable signal AEN is enabled. The current discharge circuit 432 may discharge the current of the node nd433 through the second current path in response to the voltage level of the level voltage LV when the active enable signal AEN is enabled. The current discharge circuit 432 may discharge the current of the node nd432 through the second current path in response to the voltage level of the feedback voltage VF when the active enable signal AEN is enabled.

The current discharge circuit 432 may include an NMOS transistor 432<7> that is disposed between the node nd434 and a node nd435 that has a drain and a gate connected to each other, and an NMOS transistor 432<8> and an NMOS transistor 432<9> that are connected in series between the node nd435 and the ground voltage VSS and that have their drains and gates connected to each other. The current discharge circuit 432 may generate a feedback voltage VF by dividing the internal voltage VCORE through the NMOS transistor 432<7>, the NMOS transistor 432<8>, and the NMOS transistor 432<9>.

The current discharge circuit 432 may include a current quantity adjustment circuit 432_1. The current quantity adjustment circuit 4321 may form a third current path through an NMOS transistor 432<10>, an NMOS transistor 432<11>, and an NMOS transistor 432<12> that are connected in series between the node nd434 and the ground voltage VSS and that have drains and gates connected to each other, an NMOS transistor 432<13>, an NMOS transistor 432<14>, and an NMOS transistor 432<15> that are connected in series between the node nd434 and the ground voltage VSS and that have drains and gates connected to each other, an NMOS transistor 432<16>, an NMOS transistor 432<17>, and an NMOS transistor 432<18> that are connected in series between the node nd434 and the ground voltage VSS and that have drains and gates connected to each other, and an NMOS transistor 432<19>, an NMOS transistor 432<20>, and an NMOS transistor 432<21> that are connected in series between the node nd434 and the ground voltage VSS and that have drains and gates connected to each other.

The current quantity adjustment circuit 432_1 may discharge the current of the node nd435 through the third current path that is formed by the NMOS transistor 432<10>, the NMOS transistor 432<11>, and the NMOS transistor 432<12> when the first driving control signal DBG<1> is enabled to a logic high level. The current quantity adjustment circuit 432_1 may discharge the current of the node nd435 through the third current path that is formed by the NMOS transistor 432<13>, the NMOS transistor 432<14>, and the NMOS transistor 432<15> when the second driving control signal DBG<2> is enabled to a logic high level. The current quantity adjustment circuit 432_1 may discharge the current of the node nd435 through the third current path that is formed by the NMOS transistor 432<16>, the NMOS transistor 432<17>, and the NMOS transistor 432<18> when the third driving control signal DBG<3> is enabled to a logic high level. The current quantity adjustment circuit 432_1 may discharge the current of the node nd435 through the third current path that is formed by the NMOS transistor 432<19>, the NMOS transistor 432<20>, and the NMOS transistor 432<21> when the fourth driving control signal DBG<4> is enabled to a logic high level. The current quantity adjustment circuit 432_1 may increase the amount of current that is discharged from the node nd435 through the third current path when the number of signals that are enabled, among the first to fourth driving control signals DBG<1:4>, is increased.

The amplifier circuit 313_1c according to an embodiment of the present disclosure may generate the internal voltage VCORE from the external voltage VDD after the start of a standby operation and an active operation. The amplifier circuit 313_1c can increase the amount of current that is discharged from a node through the first current path, the second current path, and the third current path, so that an operating speed and stability of the amplifier circuit 313_1c can be improved.

FIG. 12 is a circuit diagram illustrating a construction according to another embodiment of the amplifier circuit 313_1 that is included in the internal voltage generation circuit 313. The amplifier circuit 313_1d may include a current supply circuit 441 and a current discharge circuit 442.

The current supply circuit 441 may be implemented by a transfer gate 441<1> that is disposed between an external voltage VDD and a node nd441, a transfer gate 441<2> that is disposed between the external voltage VDD and a node nd442, and a PMOS transistor 441<3> that is disposed between the external voltage VDD and a node nd444. The current supply circuit 441 may generate a supply voltage VSP by receiving a current from the external voltage VDD through the node nd441 when the standby enable signal SEN is disabled to a logic low level. The node nd441 may be set as a node from which the supply voltage VSP is output. The current supply circuit 441 may increase the voltage level of the supply voltage VSP by receiving a lot of a current through the node nd441 as the voltage level of the node nd442 is decreased. The current supply circuit 441 may drive the internal voltage VCORE from the external voltage VDD when the voltage level of the supply voltage VSP is generated as the voltage level of a ground voltage VSS.

The current discharge circuit 442 may include an NMOS transistor 442<1> that is disposed between the node nd441 and a node nd443, and an NMOS transistor 442<2> and an NMOS transistor 442<3> that are connected in series between the node nd443 and the ground voltage VSS. The current discharge circuit 442 may form a first current path through the NMOS transistor 442<1>, the NMOS transistor 442<2>, and the NMOS transistor 442<3>. The current discharge circuit 442 may drive the supply voltage VSP to the voltage level of the ground voltage VSS based on the amount of current that is discharged through the first current path, in response to the voltage levels of the reference voltage VREF and the level voltage LV when the standby enable signal SEN is enabled. The current discharge circuit 442 may include an NMOS transistor 442<4> that is disposed between the node nd442 and the node nd443. The NMOS transistor 442<4> may discharge the current of the node nd442 to the node nd443 in response to the voltage level of a feedback voltage VF.

The current discharge circuit 442 may include a first current quantity adjustment circuit 442_1. The first current quantity adjustment circuit 442_1 may include an NMOS transistor 442<5> and an NMOS transistor 442<6> that are connected in series between the node nd443 and the ground voltage VSS, an NMOS transistor 442<7> and an NMOS transistor 442<8> that are connected in series between the node nd443 and the ground voltage VSS, an NMOS transistor 442<9> and an NMOS transistor 442<10> that are connected in series between the node nd443 and the ground voltage VSS, and an NMOS transistor 442<11> and an NMOS transistor 442<12> that are connected in series between the node nd443 and the ground voltage VSS. The first current quantity adjustment circuit 442_1 may form a second current path through the NMOS transistor 442<5>, the NMOS transistor 442<6>, the NMOS transistor 442<7>, the NMOS transistor 442<8>, the NMOS transistor 442<9>, the NMOS transistor 442<10>, the NMOS transistor 442<11>, and the NMOS transistor 442<12>.

The first current quantity adjustment circuit 442_1 may discharge the current of the node nd443 through the second current path that is formed by the NMOS transistor 442<5> and the NMOS transistor 442<6>, in response to the voltage level of the level voltage LV when the first driving control signal DBG<1> is enabled to a logic high level. The first current quantity adjustment circuit 442_1 may discharge the current of the node nd443 through the second current path that is formed by the NMOS transistor 442<7> and the NMOS transistor 442<8>, in response to the voltage level of the level voltage LV when the second driving control signal DBG<2> is enabled to a logic high level. The first current quantity adjustment circuit 442_1 may discharge the current of the node nd443 through the second current path that is formed by the NMOS transistor 442<9> and the NMOS transistor 442<10>, in response to the voltage level of the level voltage LV when the third driving control signal DBG<3> is enabled to a logic high level. The first current quantity adjustment circuit 442_1 may discharge the current of the node nd443 through the second current path that is formed by the NMOS transistor 442<11> and the NMOS transistor 442<12>, in response to the voltage level of the level voltage LV when the fourth driving control signal DBG<4> is enabled to a logic high level. The first current quantity adjustment circuit 442_1 may increase the amount of current that is discharged from the node nd443 through the second current path, when the number of signals that are enabled, among the first to fourth driving control signals DBG<1:4>, is increased.

The current discharge circuit 442 may include an NMOS transistor 442<13> that is disposed between the node nd444 and a node nd445 and that has a drain and a gate connected to each other, and an NMOS transistor 442<14> and an NMOS transistor 442<15> that are connected in series between the node nd445 and the ground voltage VSS and that have their drains and gates connected to each other. The current discharge circuit 442 may generate the feedback voltage VF by dividing the internal voltage VCORE through the NMOS transistor 442<13>, the NMOS transistor 442<14>, and the NMOS transistor 442<15> when the standby enable signal SEN is enabled to a logic high level.

The current discharge circuit 442 may include a second current quantity adjustment circuit 442_2. The second current quantity adjustment circuit 442_2 may form a third current path through an NMOS transistor 442<16>, an NMOS transistor 442<17>, and an NMOS transistor 442<18> that are connected in series between the node nd444 and the ground voltage VSS and that have drains and gates connected to each other, an NMOS transistor 442<19>, an NMOS transistor 442<20>, and an NMOS transistor 442<21> that are connected in series between the node nd444 and the ground voltage VSS and that have drains and gates connected to each other, an NMOS transistor 442<22>, an NMOS transistor 442<23>, and an NMOS transistor 442<24> that are connected in series between the node nd444 and the ground voltage VSS and that have drains and gates connected to each other, and an NMOS transistor 442<25>, an NMOS transistor 442<26>, and an NMOS transistor 442<27> that are connected in series between the node nd444 and the ground voltage VSS and that have drains and gates connected to each other.

The second current quantity adjustment circuit 442_2 may discharge the current of the node nd445 through the third current path that is formed by the NMOS transistor 442<16>, the NMOS transistor 442<17>, and the NMOS transistor 442<18>, when the first driving control signal DBG<1> is enabled to a logic high level. The second current quantity adjustment circuit 442_2 may discharge the current of the node nd445 through the third current path that is formed by the NMOS transistor 442<19>, the NMOS transistor 442<20>, and the NMOS transistor 442<21>, when the second driving control signal DBG<2> is enabled to a logic high level. The second current quantity adjustment circuit 442_2 may discharge the current of the node nd445 through the third current path that is formed by the NMOS transistor 442<22>, the NMOS transistor 442<23>, and the NMOS transistor 442<24>, when the third driving control signal DBG<3> is enabled to a logic high level. The second current quantity adjustment circuit 442_2 may discharge the current of the node nd445 through the third current path that is formed by the NMOS transistor 442<25>, the NMOS transistor 442<26>, and the NMOS transistor 442<27>, when the fourth driving control signal DBG<4> is enabled to a logic high level. The second current quantity adjustment circuit 442_2 may increase the amount of current that is discharged from the node nd445 through the third current path when the number of signals that are enabled, among the first to fourth driving control signals DBG<1:4>, is increased.

The amplifier circuit 313_1d according to an embodiment of the present disclosure may generate the internal voltage VCORE from the external voltage VDD after the start of a standby operation and an active operation. The amplifier circuit 313_1d can increase the amount of current that is discharged from a node through the first current path, the second current path, and the third current path, so that an operating speed and stability of the amplifier circuit 313_1d can be improved.

FIG. 13 is a diagram illustrating a construction according to an embodiment of the driving circuit 313_2 that is included in the internal voltage generation circuit 313. The driving circuit 313_2 may include a voltage input circuit 510, a precharge circuit 520, and an internal driving circuit 530.

The voltage input circuit 510 may be implemented by a transfer gate 511<1>. The voltage input circuit 510 may generate an input voltage VIN by receiving a supply voltage VSUP after the start of an active operation. The voltage input circuit 510 may generate the input voltage VIN by receiving the supply voltage VSUP when the active enable signal AEN is enabled to a logic high level.

The precharge circuit 520 may be implemented by a PMOS transistor 521<1>. The precharge circuit 520 may precharge the input voltage VIN to the voltage level of an external voltage VDD after the end of a standby operation and an active operation. The precharge circuit 520 may precharge the input voltage VIN to the voltage level of the external voltage VDD when the active delay signal AEND is disabled to a logic low level.

The internal driving circuit 530 may include a first driver 531, a second driver 532, a third driver 533, and a fourth driver 534.

The first driver 531 may be implemented by an inverter 531<1>, NAND gates 531<2> and 531<3>, a level shifter (LS) 531<4>, and an NMOS transistor 531<5>. The inverter 531<1>, the NAND gates 531<2> and 531<3>, the level shifter 531<4>, and the NMOS transistor 531<5> may be connected in series. The inverter 531<1> and the NAND gates 531<2> and 531<3> may be driven by receiving the external voltage VDD. The level shifter 531<4> may raise an input signal having the voltage level of the external voltage VDD to the voltage level of a high voltage VNG by receiving the external voltage VDD and the high voltage VNG, and may output the input signal having the raised voltage level. The NMOS transistor 531<5> may be turned on by a high driving force when the input signal having the voltage level of the high voltage VNG is input, and may drive the internal voltage VCORE to the voltage level of the external voltage VDD. The first driver 531 may drive the internal voltage VCORE to the voltage level of the external voltage VDD, when the first driving control signal DBG<1> is enabled to a logic high level, the power-up signal PWR is enabled to a logic high level, and the voltage level of the input voltage VIN is generated as the voltage level of the ground voltage VSS. The high voltage VNG may be set as a voltage that is generated to have a higher voltage level than the external voltage VDD after a power-up operation.

The second driver 532 may be implemented by an inverter 532<1>, NAND gates 532<2> and 532<3>, a level shifter (LS) 532<4>, and an NMOS transistor 532<5>. The inverter 532<1>, the NAND gates 532<2> and 532<3>, the level shifter 532<4>, and the NMOS transistor 532<5> may be connected in series. The inverter 532<1>, the NAND gates 532<2>, and 532<3> may be driven by receiving the external voltage VDD. The level shifter 532<4> may raise an input signal having the voltage level of the external voltage VDD to the voltage level of the high voltage VNG by receiving the external voltage VDD and the high voltage VNG, and may output the input signal having the raised voltage level. The NMOS transistor 532<5> may be turned on by a high driving force when the input signal having the voltage level of the high voltage VNG is input, and may drive the internal voltage VCORE to the voltage level of the external voltage VDD. The second driver 532 may drive the internal voltage VCORE to the voltage level of the external voltage VDD, when the second driving control signal DBG<2> is enabled to a logic high level, the power-up signal PWR is enabled to a logic high level, and the voltage level of the input voltage VIN is generated as the voltage level of the ground voltage VSS.

The third driver 533 may be implemented by an inverter 533<1>, NAND gates 533<2> and 533<3>, a level shifter (LS) 533<4>, and an NMOS transistor 533<5>. The inverter 533<1>, the NAND gates 533<2> and 533<3>, the level shifter 533<4>, and the NMOS transistor 533<5> may be connected in series. The inverter 533<1> and the NAND gates 533<2> and 533<3> may be driven by receiving the external voltage VDD. The level shifter 533<4> may raise an input signal having the voltage level of the external voltage VDD to the voltage level of the high voltage VNG by receiving the external voltage VDD and the high voltage VNG, and may output the input signal having the raised voltage level. The NMOS transistor 533<5> may be turned on by a high driving force when the input signal having the voltage level of the high voltage VNG is input, and may drive the internal voltage VCORE to the voltage level of the external voltage VDD. The third driver 533 may drive the internal voltage VCORE to the voltage level of the external voltage VDD, when the third driving control signal DBG<3> is enabled to a logic high level, the power-up signal PWR is enabled to a logic high level, and the voltage level of the input voltage VIN is generated as the voltage level of the ground voltage VSS.

The fourth driver 534 may be implemented by an inverter 534<1>, NAND gates 534<2> and 534<3>, a level shifter (LS) 534<4>, and an NMOS transistor 534<5>. The inverter 534<1>, the NAND gates 534<2> and 534<3>, the level shifter 534<4>, and the NMOS transistor 534<5> may be connected in series. The inverter 534<1> and the NAND gates 534<2> and 534<3> may be driven by receiving the external voltage VDD. The level shifter 534<4> may raise an input signal having the voltage level of the external voltage VDD to the voltage level of the high voltage VNG by receiving the external voltage VDD and the high voltage VNG, and may output the input signal having the raised voltage level. The NMOS transistor 534<5> may be turned on by a high driving force when the input signal having the voltage level of the high voltage VNG is input, and may drive the internal voltage VCORE to the voltage level of the external voltage VDD. The fourth driver 534 may drive the internal voltage VCORE to the voltage level of the external voltage VDD, when the fourth driving control signal DBG<4> is enabled to a logic high level, the power-up signal PWR is enabled to a logic high level, and the voltage level of the input voltage VIN is generated as the voltage level of the ground voltage VSS.

The internal driving circuit 530 may drive the internal voltage VCORE to the voltage level of the external voltage VDD by selectively driving the first driver 531, the second driver 532, the third driver 533, and the fourth driver 534 based on the first to fourth operation control signals DBG<1: 4>. The internal driving circuit 530 may increase a driving force that drives the internal voltage VCORE when the number of signals that are enabled, among the first to fourth operation control signals DBG<1:4>, is increased. The internal driving circuit 530 has been implemented to include the first driver 531, the second driver 532, the third driver 533, and the fourth driver 534, but may be implemented to include various numbers of drivers according to an embodiment.

Figure 14:
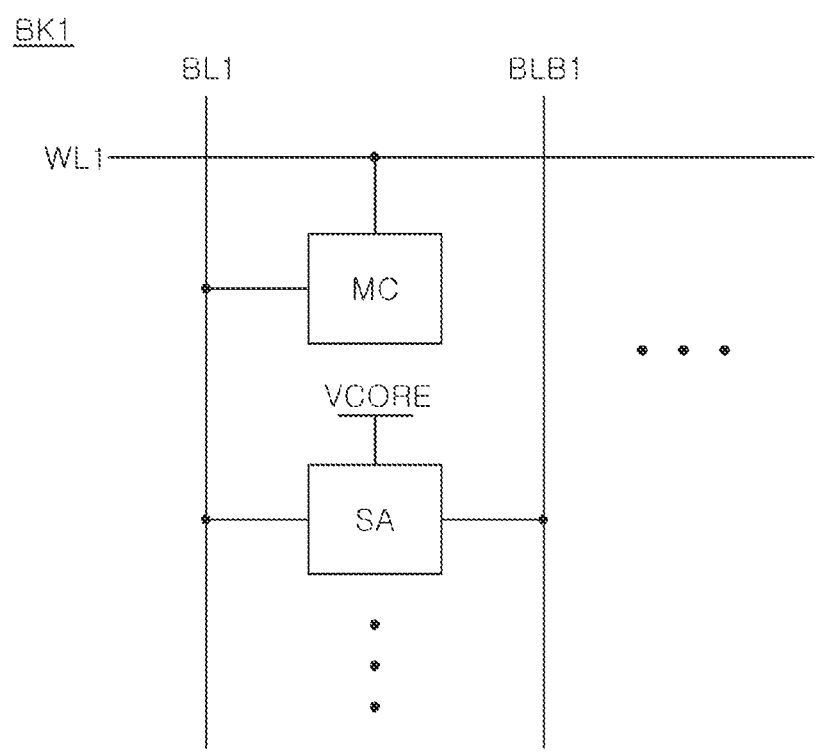
FIG. 14 is a block diagram illustrating a construction according to an embodiment of a first bank that is included in the memory circuit illustrated in FIG. 2.

FIG. 14 is a block diagram illustrating a construction according to an embodiment of the first bank BK1 that is included in the core circuit 320.

The first bank BK1 may include a memory cell MC that is disposed between a first word line WL1 and a first bit line BL1. The first bank BK1 may be activated when the first bank address BA<1> is enabled. The first word line WL1 of the first bank BK1 may be activated when the first bank address BA<1> is enabled after the start of an active operation and a refresh operation. The memory cell MC of the first bank BK1 may store the first internal data ID<1> that has been loaded onto the first bit line BL1, when the first bit line BL1 is activated, based on the first to M-th internal addresses IADD<1:M> after the start of a write operation after the active operation. The memory cell MC of the first bank BK1 may output, to the first bit line BL1, the first internal data ID<1> that has been stored in the memory cell MC, when the first bit line BL1 is activated, based on the first to M-th internal addresses IADD<1:M> after the start of a read operation after the active operation.

The first bank BK1 may include a sense amplifier SA that is disposed between the first bit line BL1 and a first inversion bit line BLB1. The sense amplifier SA of the first bank BK1 may sense and amplify a voltage difference between the first bit line BL1 and the first inversion bit line BLB1 by receiving the internal voltage VCORE, after the start of a write operation and a read operation after an active operation.

The first bank BK1 illustrated in FIG. 14 has been illustrated as including the first word line WL1, but may be implemented to include multiple word lines. The first bank BK1 has been illustrated as including the first bit line BL1 and the first inversion bit line BLB1, but may be implemented to include multiple bit lines and multiple inversion bit lines. The first bank BK1 has been illustrated as including one memory cell MC and one sense amplifier SA, but may be implemented to include multiple memory cells and multiple sense amplifiers. The second bank BK2, the third bank BK3, and the fourth bank BK4 illustrated in FIG. 2 may each be implemented to have the same construction as the first bank BK1, and may each perform the same operation as the first bank BK1. Accordingly, a detailed description of each of the second bank BK2, the third bank BK3, and the fourth bank BK4 will be omitted.

Figure 15:
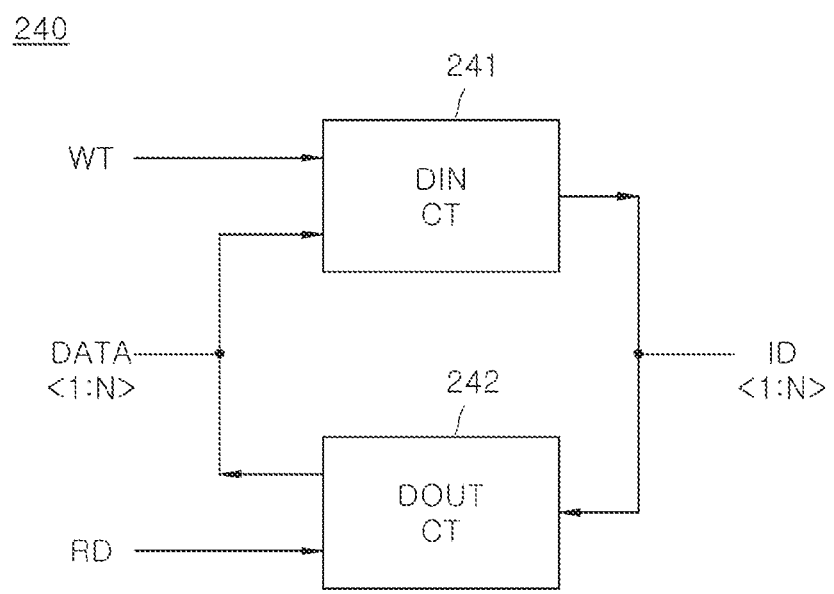
FIG. 15 is a block diagram illustrating a construction according to an embodiment of a data processing circuit that is included in the semiconductor device illustrated in FIG. 2.

FIG. 15 is a block diagram illustrating a construction according to an embodiment of the data processing circuit 240 that is included in the semiconductor device 20. The data processing circuit 240 may include a data input circuit (DIN CT) 241 and a data output circuit (DOUT CT) 242.

The data input circuit 241 may generate the first to N-th internal data ID<1:N> by receiving the first to N-th data DATA<1:N> from the controller 10 after the start of a write operation. The data input circuit 241 may generate the first to N-th internal data ID<1:N> by aligning and parallelizing the first to N-th data DATA<1:N> that are input in series, when the write command WT is enabled. The data input circuit 241 may output the first to N-th internal data ID<1:N> to the core circuit 320 when the write command WT is enabled.

The data output circuit 242 may generate the first to N-th data DATA<1:N> by receiving the first to N-th internal data ID<1:N> from the core circuit 320 after the start of a read operation. The data output circuit 242 may generate the first to N-th data DATA<1:N> by aligning and serializing the first to N-th internal data ID<1:N> that are input in parallel, when the read command RD is enabled. The data output circuit 242 may output the first to N-th data DATA<1:N> to the controller 10 when the read command RD is enabled.

The semiconductor system 1 according to an embodiment of the present disclosure can reduce the area and current consumption of the semiconductor system 1 by generating an internal voltage through the sharing of the amplifier circuit and the driver after the start of a standby operation and an active operation. The semiconductor system 1 can improve an operating speed and stability of the amplifier circuit by increasing the amount of current that is discharged from a node through a current path of the amplifier circuit after the start of a standby operation and an active operation. The semiconductor system 1 can generate an internal voltage through the sharing of the amplifier circuit and the driver after the start of a standby operation and an active operation, and can perform an active operation, a refresh operation, a write operation, and a read operation by receiving the internal voltage.

Figure 16:
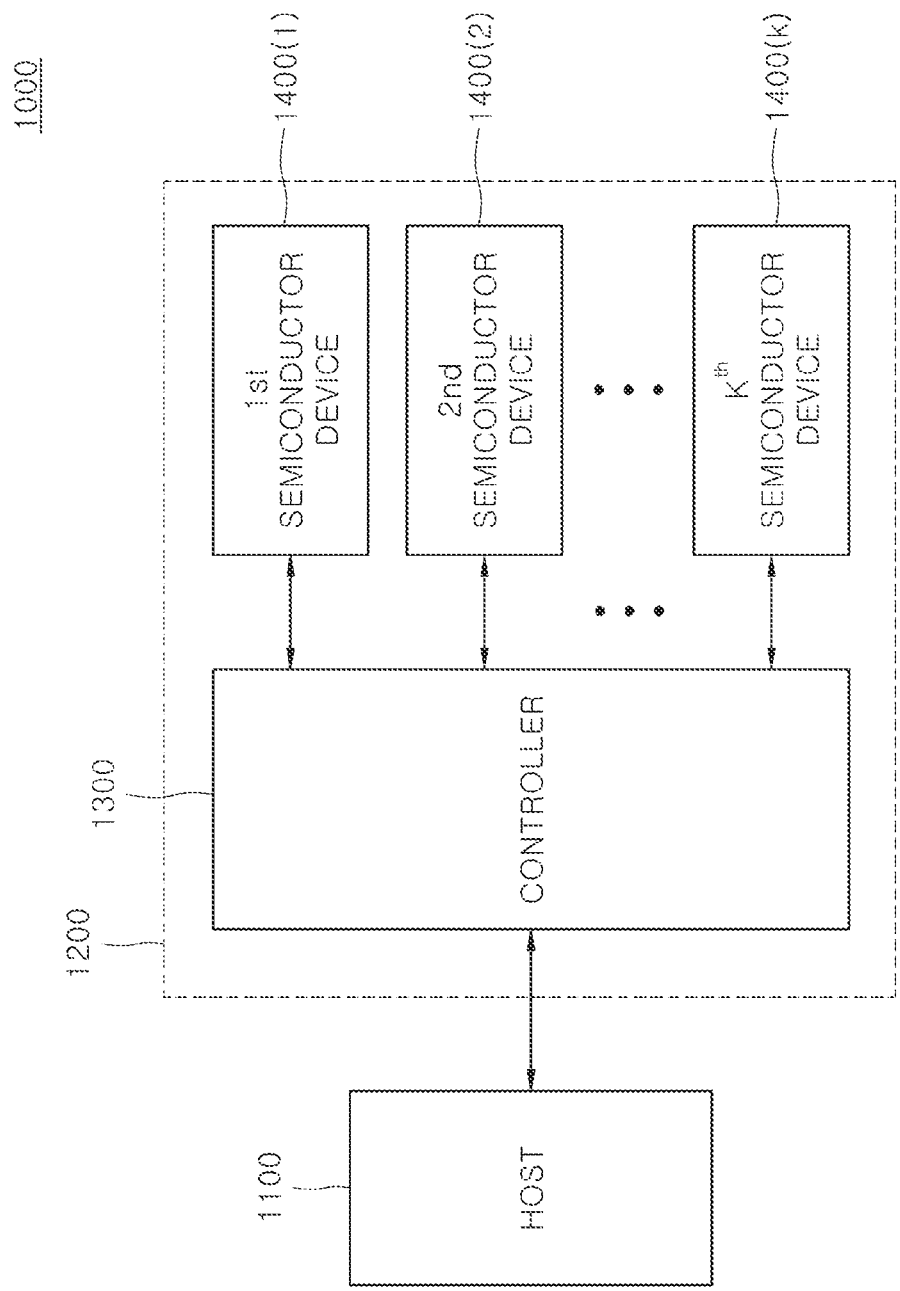
FIG. 16 is a diagram illustrating a construction according to an embodiment of an electronic system to which the semiconductor system illustrated in FIGS. 1 and 15 has been applied.

FIG. 16 is a block diagram illustrating a construction according to an embodiment of an electronic system 1000 according to an embodiment of the present disclosure. As illustrated in FIG. 16, the electronic system 1000 may include a host 1100 and a semiconductor system 1200.

The host 1100 and the semiconductor system 1200 may mutually transmit signals by using an interface protocol. The interface protocol that is used between the host 1100 and the semiconductor system 1200 may include a multi-media card (MMC), an enhanced small disk interface (ESDI), integrated drive electronics (IDE), peripheral component interconnect-express (PCI-E), advanced technology attachment (ATA), serial ATA (SATA), parallel ATA (PATA), a serial attached SCSI (SAS), a universal serial bus (USB).

The semiconductor system 1200 may include a controller 1300 and semiconductor devices 1400(k:1). The controller 1300 may control the semiconductor devices 1400(k:1) so that the semiconductor devices 1400(k:1) perform a standby operation, an active operation, a refresh operation, a write operation, and a read operation. Each of the semiconductor devices 1400(k:1) can reduce the area and current consumption of the semiconductor device by generating an internal voltage through the sharing of the amplifier circuit and the driver after the start of a standby operation and an active operation. Each of the semiconductor devices 1400(*k*:1) can improve an operating speed and stability of the amplifier circuit by increasing the amount of current that is discharged from a node through a current path of the amplifier circuit after the start of a standby operation and an active operation. Each of the semiconductor devices 1400(*k*:1) can generate an internal voltage through the sharing of the amplifier circuit and the driver after the start of a standby operation and an active operation, and can perform an active operation, a refresh operation, a write operation, and a read operation by receiving the internal voltage.

The controller 1300 may be implemented as the controller illustrated in FIG. 1. Each of the semiconductor devices 1400(*k*:1) may be implemented as the semiconductor device 20 illustrated in FIGS. 1 and 2. According to an embodiment, each of the semiconductor devices 1400(*k*:1) may be implemented with one of dynamic random-access memory (DRAM), phase change random-access memory (PRAM), resistive random-access memory (RRAM), magnetic random-access memory (MRAM), and ferroelectric random-access memory (FRAM).

What is claimed is:

1. A semiconductor device comprising:
an internal voltage control circuit comprising an amplifier circuit and a plurality of drivers and configured to drive an internal voltage through a sharing of the amplifier circuit and a driver that is activated, among the plurality of drivers, after a start of a standby operation and an active operation; and
a core circuit comprising a plurality of banks and configured to perform an operation of a bank that is activated, among the plurality of banks, by receiving the internal voltage,
wherein the amplifier circuit is configured to drive the internal voltage based on an amount of current that is discharged through a current path, after the start of the standby operation and the active operation.

2. The semiconductor device of claim 1, wherein the internal voltage control circuit is configured to drive the internal voltage to a voltage level of an external voltage as the plurality of drivers of the internal voltage control circuit is activated based on a plurality of bank addresses.

3. The semiconductor device of claim 1, wherein the internal voltage control circuit comprises:
a driving control circuit configured to generate a standby enable signal, a reference voltage, and a level voltage, based on a test mode signal, a power-up signal, and an active enable signal;
a control signal generation circuit configured to generate the active enable signal, an active delay signal, and a plurality of driving control signals, based on the test mode signal, an active command, and a plurality of bank addresses for activating the plurality of banks; and
an internal voltage generation circuit configured to drive the internal voltage in response to voltage levels of the reference voltage and the level voltage when the standby enable signal is enabled and configured to drive the internal voltage based on the plurality of driving control signals when the active enable signal and the active delay signal are enabled.

4. The semiconductor device of claim 3, wherein the driving control circuit comprises:
a standby enable signal generation circuit configured to generate the standby enable signal by inverting the test mode signal;
a reference voltage generation circuit configured to generate the reference voltage having a predetermined voltage level, when a power-up operation is completed and the power-up signal is enabled; and
a level voltage generation circuit configured to generate the level voltage having a voltage level set based on the reference voltage and mode information.

5. The semiconductor device of claim 3, wherein the control signal generation circuit comprises:
a driving control signal generation circuit configured to generate the plurality of driving control signals based on the plurality of bank addresses when the active command is enabled; and
an enable signal generation circuit configured to generate the active enable signal and the active delay signal that are enabled when at least any one of the plurality of bank addresses is enabled and the test mode signal is disabled.

6. The semiconductor device of claim 3, wherein the internal voltage generation circuit comprises:
the amplifier circuit configured to generate a supply voltage from an external voltage when the standby enable signal is disabled, configured to drive the supply voltage to a voltage level of a ground voltage in response to voltage levels of the reference voltage and the level voltage when the standby enable signal is enabled, and configured to drive the internal voltage by forming a current path in response to voltage levels of the active enable signal, the plurality of driving control signals, and the level voltage; and
a driving circuit comprising the plurality of drivers configured to drive the internal voltage based on the plurality of driving control signals when the active enable signal and the active delay signal are enabled.

7. The semiconductor device of claim 6, wherein the amplifier circuit comprises:
a current supply circuit configured to generate the supply voltage by receiving a current from the external voltage when the standby enable signal is disabled and configured to drive the internal voltage when the voltage level of the supply voltage is generated as the voltage level of the ground voltage; and
a current discharge circuit configured to form a first current path in response to the voltage levels of the reference voltage and the level voltage when the standby enable signal is enabled, configured to drive the supply voltage to the voltage level of the ground voltage based on an amount of current that is discharged through the first current path, configured to form a second current path in response to voltage levels of a feedback voltage and the level voltage when the active enable signal is enabled, and configured to discharge a current of a node through the second current path.

8. The semiconductor device of claim 6, wherein the amplifier circuit comprises:
a current supply circuit configured to generate the supply voltage by receiving a current from the external voltage when the standby enable signal is disabled and configured to drive the internal voltage when the voltage level of the supply voltage is generated as the voltage level of the ground voltage; and
a current discharge circuit configured to form a first current path in response to the voltage levels of the reference voltage and the level voltage when the standby enable signal is enabled, configured to drive the supply voltage to the voltage level of the ground voltage based on an amount of current that is discharged through the first current path, configured to form a second current path based on a feedback voltage and the plurality of driving control signals, and configured to discharge a current of a node through the second current path.

9. The semiconductor device of claim 8, wherein the current discharge circuit comprises a current quantity adjustment circuit configured to form the second current path based on the plurality of driving control signals and configured to increase the amount of current that is discharged through the second current path when a number of the plurality of driving control signals that are enabled is increased.

10. The semiconductor device of claim 6, wherein the amplifier circuit comprises:
a current supply circuit configured to generate the supply voltage by receiving a current from the external voltage when the standby enable signal is disabled and configured to drive the internal voltage when the voltage level of the supply voltage is generated as the voltage level of the ground voltage; and
a current discharge circuit configured to form a first current path in response to the voltage levels of the reference voltage and the level voltage when the standby enable signal is enabled, configured to drive the supply voltage to the voltage level of the ground voltage based on an amount of current that is discharged through the first current path, configured to form a second current path in response to the voltage level of the level voltage when the active enable signal is enabled, configured to discharge a current of a first node through the second current path, configured to form a third current path based on the plurality of driving control signals, and configured to discharge a current of a second node to which a feedback voltage is supplied through the third current path.

11. The semiconductor device of claim 10, wherein the current discharge circuit comprises a current quantity adjustment circuit configured to form the third current path based on the plurality of driving control signals and configured to increase an amount of current that is discharged through the third current path when a number of the plurality of driving control signals that are enabled is increased.

12. The semiconductor device of claim 6, wherein the amplifier circuit comprises:
a current supply circuit configured to generate the supply voltage by receiving a current from the external voltage when the standby enable signal is disabled and configured to drive the internal voltage when the voltage level of the supply voltage is generated as the voltage level of the ground voltage; and
a current discharge circuit configured to form a first current path in response to the voltage levels of the reference voltage and the level voltage when the standby enable signal is enabled, configured to drive the supply voltage to the voltage level of the ground voltage based on an amount of current that is discharged through the first current path, configured to form a second current path based on the level voltage and the plurality of driving control signals, configured to discharge a current of a first node through the second current path, configured to form a third current path based on the plurality of driving control signals, and configured to discharge a current of a second node to which a feedback voltage is supplied through the third current path.

13. The semiconductor device of claim 12, wherein the current discharge circuit comprises:
a first current quantity adjustment circuit configured to form the second current path based on the plurality of driving control signals and configured to increase an amount of current that is discharged through the second current path when a number of the plurality of driving control signals that are enabled is increased; and
a second current quantity adjustment circuit configured to form the third current path based on the plurality of driving control signals and configured to increase an amount of current that is discharged through the third current path when the number of the plurality of driving control signals that are enabled is increased.

14. A semiconductor device comprising:
an amplifier circuit configured to drive an internal voltage after a start of a standby operation and an active operation and configured to adjust an amount of current based on a first driving control signal and a second driving control signal; and
a driving circuit comprising a first driver and a second driver,
wherein the driving circuit is configured to
drive the internal voltage through the first driver by receiving a supply voltage when the first driving control signal is enabled after the start of the active operation, and
drive the internal voltage through the second driver by receiving the supply voltage when the second driving control signal is enabled after the start of the active operation.

15. The semiconductor device of claim 14, wherein:
the amplifier circuit is configured to drive the internal voltage by adjusting an amount of current based on the first driving control signal and the second driving control signal that are sequentially enabled after a start of a refresh operation, and
both the first driver and the second driver are configured to be activated based on the first driving control signal and the second driving control signal that are sequentially enabled after the start of the refresh operation and configured to drive the internal voltage.

16. The semiconductor device of claim 14, wherein the amplifier circuit comprises:
a current supply circuit configured to generate the supply voltage by receiving a current from an external voltage when a standby enable signal is disabled and configured to drive the internal voltage when a voltage level of the supply voltage is generated as a voltage level of a ground voltage; and
a current discharge circuit configured to form a first current path in response to voltage levels of a reference voltage and a level voltage when the standby enable signal is enabled after the start of the standby operation, configured to drive the supply voltage to the voltage level of the ground voltage based on an amount of current that is discharged through the first current path, configured to form a second current path in response to voltage levels of a feedback voltage and the level voltage when an active enable signal is enabled after the start of the active operation, and configured to discharge a current of a node through the second current path.

17. The semiconductor device of claim 14, wherein the amplifier circuit comprises:
a current supply circuit configured to generate the supply voltage by receiving a current from an external voltage when a standby enable signal is disabled and configured to drive the internal voltage when a voltage level of the supply voltage is generated as a voltage level of a ground voltage; and a current discharge circuit configured to form a first current path in response to voltage levels of a reference voltage and a level voltage when the standby enable signal is enabled after the start of the standby operation, configured to drive the supply voltage to the voltage level of the ground voltage based on an amount of current that is discharged through the first current path, configured to form a second current path based on a feedback voltage, the first driving control signal, and the second driving control signal, and configured to discharge a current of a node through the second current path.

18. The semiconductor device of claim 17, wherein the current discharge circuit comprises a current quantity adjustment circuit configured to form the second current path based on the first driving control signal and the second driving control signal and configured to adjust an amount of current that is discharged through the second current path based on a number of the first driving control signal and the second driving control signal that are enabled.

19. The semiconductor device of claim 14, wherein the amplifier circuit comprises:

a current supply circuit configured to generate the supply voltage by receiving a current from an external voltage when a standby enable signal is disabled and configured to drive the internal voltage when a voltage level of the supply voltage is generated as a voltage level of a ground voltage; and a current discharge circuit configured to form a first current path in response to voltage levels of a reference voltage and a level voltage when the standby enable signal is enabled after the start of the standby operation, configured to drive the supply voltage to the voltage level of the ground voltage based on an amount of current that is discharged through the first current path, configured to form a second current path in response to the voltage level of the level voltage when the active enable signal is enabled after the start of the active operation, configured to discharge a current of a first node through the second current path, configured to form a third current path based on the first driving control signal and the second driving control signal, and configured to discharge a current of a second node to which a feedback voltage is supplied through the third current path.

20. The semiconductor device of claim 19, wherein the current discharge circuit comprises a current quantity adjustment circuit configured to form the third current path based on the first driving control signal and the second driving control signal and configured to adjust an amount of current that is discharged through the third current path based on a number of control signals that are enabled, among the first driving control signal and the second driving control signal.

21. The semiconductor device of claim 14, wherein the amplifier circuit comprises:

a current supply circuit configured to generate the supply voltage by receiving a current from an external voltage when a standby enable signal is disabled and configured to drive the internal voltage when a voltage level of the supply voltage is generated as a voltage level of a ground voltage; and a current discharge circuit configured to form a first current path in response to voltage levels of a reference voltage and a level voltage when the standby enable signal is enabled after the start of the standby operation, configured to drive the supply voltage to the voltage level of the ground voltage based on an amount of current that is discharged through the first current path, configured to form a second current path based on the level voltage, the first driving control signal, and the second driving control signal, configured to discharge a current of a first node through the second current path, configured to form a third current path based on the first driving control signal and the second driving control signal, and configured to discharge a current of a second node to which a feedback voltage is supplied through the third current path.

22. The semiconductor device of claim 21, wherein the current discharge circuit comprises:

a first current quantity adjustment circuit configured to form the second current path based on the first driving control signal and the second driving control signal and configured to increase an amount of current that is discharged through the second current path when a number of the first driving control signal and the second driving control signal that are enabled is increased; and a second current quantity adjustment circuit configured to form the third current path based on the first driving control signal and the second driving control signal and configured to increase an amount of current that is discharged through the third current path when the number of the first driving control signal and the second driving control signal that are enabled is increased.

23. The semiconductor device of claim 14, wherein the driving circuit further comprises:

a voltage input circuit configured to generate an input voltage by receiving the supply voltage when an active enable signal is enabled after the start of the active operation; and a precharge circuit configured to drive the input voltage to a voltage level of an external voltage when an active delay signal is enabled after an end of the standby operation and the active operation.

24. The semiconductor device of claim 23, wherein:

the first driver is configured to be activated when the first driving control signal is enabled and configured to drive the internal voltage based on a high voltage having a higher voltage level than the external voltage by receiving the input voltage, and the second driver is configured to be activated when the second driving control signal is enabled and configured to drive the internal voltage based on the high voltage by receiving the input voltage.

* * * * *